(12) United States Patent
Cheong et al.

(10) Patent No.: US 11,127,983 B2
(45) Date of Patent: Sep. 21, 2021

(54) ELECTRONIC DEVICE INCLUDING BATTERY STRUCTURE

(71) Applicant: Samsung Electronics Co., Ltd., Gyeonggi-do (KR)

(72) Inventors: Hyunmi Cheong, Gyeonggi-do (KR); Jonghwa Kim, Gyeonggi-do (KR); Younghoon Lee, Gyeonggi-do (KR); Daehyuk Chin, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 191 days.

(21) Appl. No.: 16/282,455

(22) Filed: Feb. 22, 2019

(65) Prior Publication Data

US 2019/0267674 A1   Aug. 29, 2019

(30) Foreign Application Priority Data

Feb. 27, 2018 (KR) .................. 10-2018-0023812

(51) Int. Cl.
*H01M 10/0587* (2010.01)
*H01M 10/04* (2006.01)
(Continued)

(52) U.S. Cl.
CPC ... *H01M 10/0587* (2013.01); *H01M 10/0431* (2013.01); *H01M 50/116* (2021.01);
(Continued)

(58) Field of Classification Search
CPC ........... H01M 10/0587; H04M 1/3883; H04M 1/0262; H04B 1/3883
See application file for complete search history.

(56) References Cited

U.S. PATENT DOCUMENTS 7,722,984 B2   5/2010   Kim et al.
7,947,390 B2   5/2011   Kim et al.
(Continued)

FOREIGN PATENT DOCUMENTS

CN   204668378 U   9/2015
JP   2014-017719 A   1/2014
(Continued)

OTHER PUBLICATIONS

International Search Report dated Jun. 13, 2019.
European Search Report dated Jul. 1, 2019.

*Primary Examiner* — Matthew J Merkling
(74) *Attorney, Agent, or Firm* — Cha & Reiter, LLC

(57) ABSTRACT

In one embodiment of the disclosure an electronic device comprising: a display; a first plate having opposing first and second faces, wherein the display is disposed on the first face; a second plate coupled to the second face of the first plate, at least one adhesive layer including a first adhesive layer adhering to the second face of the first plate, a jelly-roll, a roll fixing tape disposed on one region of the jelly-roll, a pouch containing the jelly-roll and the roll fixing tape, wherein the at least one adhesive layer including the first adhesive layer is disposed between and attached to one face of the pouch, and wherein one end of the first adhesive layer and one end of the roll fixing tape face are in the same direction while the first adhesive layer and the roll fixing tape vertically surround the one face of the pouch.

16 Claims, 14 Drawing Sheets

(51) Int. Cl.
*H04M 1/02* (2006.01)
*H04B 1/3883* (2015.01)
*H04B 1/3888* (2015.01)
*H01M 50/116* (2021.01)
*H01M 50/124* (2021.01)
*H01M 50/543* (2021.01)

(52) U.S. Cl.
CPC ..... *H01M 50/124* (2021.01); *H01M 50/1245* (2021.01); *H01M 50/543* (2021.01); *H04B 1/3883* (2013.01); *H04B 1/3888* (2013.01); *H04M 1/0262* (2013.01); *H01M 2220/30* (2013.01); *H04M 2001/0204* (2013.01)

(56) References Cited

U.S. PATENT DOCUMENTS

| | | |
|---|---|---|
| 8,133,609 B2 | 3/2012 | Kim et al. |
| 2004/0038125 A1 | 2/2004 | Kim et al. |
| 2004/0142236 A1* | 7/2004 | Kim ................. H01M 10/0587 |
| | | 429/144 |
| 2006/0073380 A1* | 4/2006 | Kim ................. H01M 10/4235 |
| | | 429/129 |
| 2006/0134512 A1* | 6/2006 | Woo .................... H01M 2/0267 |
| | | 429/94 |
| 2007/0065718 A1 | 3/2007 | Moon |
| 2009/0274953 A1* | 11/2009 | Myers .................... B23P 19/04 |
| | | 429/100 |
| 2010/0203381 A1 | 8/2010 | Kim et al. |
| 2010/0255357 A1* | 10/2010 | Baek ................... H01M 10/052 |
| | | 429/94 |
| 2011/0223474 A1 | 9/2011 | Kim et al. |
| 2012/0115025 A1 | 5/2012 | Kim et al. |
| 2015/0111088 A1 | 4/2015 | Hiroki et al. |
| 2015/0147640 A1 | 5/2015 | Kim et al. |
| 2017/0033335 A1 | 2/2017 | Kojima et al. |
| 2018/0159097 A1* | 6/2018 | Fukushima ............ G03B 17/56 |
| 2018/0241015 A1 | 8/2018 | You et al. |
| 2019/0027807 A1 | 1/2019 | Choi et al. |
| 2019/0245957 A1* | 8/2019 | Bui ........................ G06F 1/203 |

FOREIGN PATENT DOCUMENTS

| | | |
|---|---|---|
| KR | 10-2006-0059701 A | 6/2006 |
| KR | 10-2010-0002902 A | 1/2010 |
| WO | 2017/065417 A1 | 4/2017 |
| WO | 2017/126863 A1 | 7/2017 |

* cited by examiner

ELECTRONIC DEVICE INCLUDING BATTERY STRUCTURE

CROSS-REFERENCE TO RELATED APPLICATION(S)

This application is based on and claims priority under 35 U.S.C. § 119 to Korean Patent Application No. 10-2018-0023812, filed on Feb. 27, 2018, in the Korean Intellectual Property Office, the disclosure of which is incorporated by reference herein its entirety.

BACKGROUND

1. Field

The disclosure relates to a battery of an electronic device.

2. Description of Related Art

A battery may be used for supplying power, which is used in a portable electronic device. The battery may include a jelly-roll, and a pouch for enclosing the jelly-roll therein.

The above information is presented as background information only to assist with an understanding of the disclosure. No determination has been made, and no assertion is made, as to whether any of the above might be applicable as prior art with regard to the disclosure.

SUMMARY

When an electronic device falls, a battery pouch can deform due to differences in adhesion between a tape-attached portion and a tape-free portion thereof. This may cause a rupture of the battery pouch or a deformation of a jelly-roll disposed in the pouch. When the pouch ruptures or the jelly-roll deformation occurs, a leakage of an electrolytic solution enclosed in the pouch or a heat generation may occur.

Aspects of the disclosure may address at least the above-mentioned problems and/or disadvantages and may provide at least the advantages described below. Accordingly, one aspect of the disclosure is to provide an electronic device including a battery structure that may reduce a deformation due to an external pressure.

In accordance with an aspect of the disclosure, an electronic device comprises a first plate, wherein the first plate includes a first face; a second plate, wherein the second plate includes a second face opposite to the first face, wherein the first plate and the second plate form at least a part of a housing; and a jelly-roll including at least one face having a rectangular shape, wherein the jelly-roll includes: a first outer surface parallel to the rectangular face, and facing in a first direction; a second outer surface facing in a second direction opposite to the first direction; a third outer surface facing in a third direction perpendicular to the first and second directions and to the rectangular face, wherein the third outer surface connects the first outer surface and the second outer surface; and a fourth outer surface facing in a fourth direction opposite to the third direction, wherein the fourth outer surface connects the first outer surface and the second outer surface, a positive electrode substrate, a separator, and a negative electrode substrate wrapped around the rectangular face of the jelly roll; a pouch containing the jelly-roll, a polymer layer including stretched polystyrene, wherein the polymer layer is disposed between the pouch and the first outer surface or the second outer surface or between the third outer surface and the fourth outer surface when viewed from the first outer surface; a first adhesive layer disposed between and contacting the pouch and the first face, wherein the first adhesive layer includes a first edge extending in parallel with the third outer surface and a second edge extending in parallel with the fourth outer surface when viewed from the first outer surface; and a second adhesive layer disposed between and contacting the pouch and the second face, wherein the second adhesive layer includes a third edge extending in parallel with the third outer surface and a fourth edge extending in parallel with the fourth outer surface when viewed from the first outer surface; wherein the first edge and the third edge are substantially aligned with each other when viewed from the first outer surface, and wherein the second edge and the fourth edge are substantially aligned with each other when viewed from the first outer surface.

In accordance with an aspect of the disclosure, an electronic device comprising: a display; a first plate having opposing first and second faces, wherein the display is disposed on the first face; a second plate coupled to the second face of the first plate, at least one adhesive layer including a first adhesive layer adhering to the second face of the first plate, a jelly-roll, a roll fixing tape disposed on one region of the jelly-roll, a pouch containing the jelly-roll and the roll fixing tape, wherein the at least one adhesive layer including the first adhesive layer is disposed between and attached to one face of the pouch, and wherein one end of the first adhesive layer and one end of the roll fixing tape face are in the same direction while the first adhesive layer and the roll fixing tape vertically surround the one face of the pouch.

According to various embodiments of the disclosure, a stress due to a flow of the jelly-roll disposed in the battery may be distributed evenly so that the deformation or the rupture of the pouch may be reduced, therefore the electrolyte solution leakage and the heat generation may be reduced.

In addition, various effects may be provided that are directly or indirectly understood through the present specification.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the disclosure will be more apparent from the following description taken in conjunction with the accompanying drawings, in which.

The same or similar reference numerals are used for the same or similar components throughout the drawings and the description.

DETAILED DESCRIPTION

Hereinafter, various embodiments of the disclosure are described with reference to the accompanying drawings. It should be understood, however, that the disclosure is not intended to be limited to the specific embodiments, on the contrary, includes various modifications, equivalents, and/or alternatives of the embodiments of the disclosure.

An electronic device according to various embodiments disclosed herein may include various types of devices. The electronic device may include at least one of, for example, a portable communication device (e.g., a smart phone), a computer device (e.g., a personal digital assistant (PDA), a tablet PC, a laptop PC, a desktop PC, a workstation, or a server), a portable multimedia device (e.g., an e-book reader, or a MP3 player), a portable medical device (e.g., a heat rate/blood glucose/blood pressure/a body temperature measuring device), a camera, or a wearable device. The wearable device may include at least one of an accessory type device (e.g., a watch, a ring, a bracelet, an anklet, a necklace, glasses, contact lenses, or a head-mounted-device (HMD)), a textile or garment-integrated type (e.g. an electronic textile), a body attaching type (e.g. a skin pad or a tattoo), or an implantable circuit. In some embodiments, the electronic device may include at least one of, for example, a television, a digital video disk (DVD) player, an audio device, an audio accessory device (e.g., a speaker, a headphone, or a headset), a refrigerator, an air conditioner, a vacuum cleaner, an oven, a microwave, a washing machine, an air purifier, a set top box, a home automation control panel, a security control panel, a game console, an electronic dictionary, an electronic key, a camcorder, or an electronic frame.

In another embodiment, the electronic device may include at least one of, for example, a navigation device, a global navigation satellite system (GNSS), an event data recorder (EDR) (e.g., a vehicle/ship/airplane black box), an automotive infotainment device (e.g., a head-up display for a vehicle), an industrial or household robot, a drone, an automated teller machine (ATM), a point of sale (POS) device, a measuring device (e.g., a water, electricity, or gas measuring device), or an IoT device (e.g., a light bulb, a sprinkler device, a smoke detector, a temperature regulator, or a street light). The electronic device according to an embodiment of the present specification is not limited to the above-described devices. In addition, the electronic device may provide functions of a plurality of devices complexly, for example such as a case of a smart phone equipped with a measurement function of an individual's biometric information (e.g., heartbeat, or blood sugar). In the present specification, a term "user" may refer to a person using the electronic device or a device (e.g., an artificial intelligent electronic device) using the electronic device.

Figure 1A:
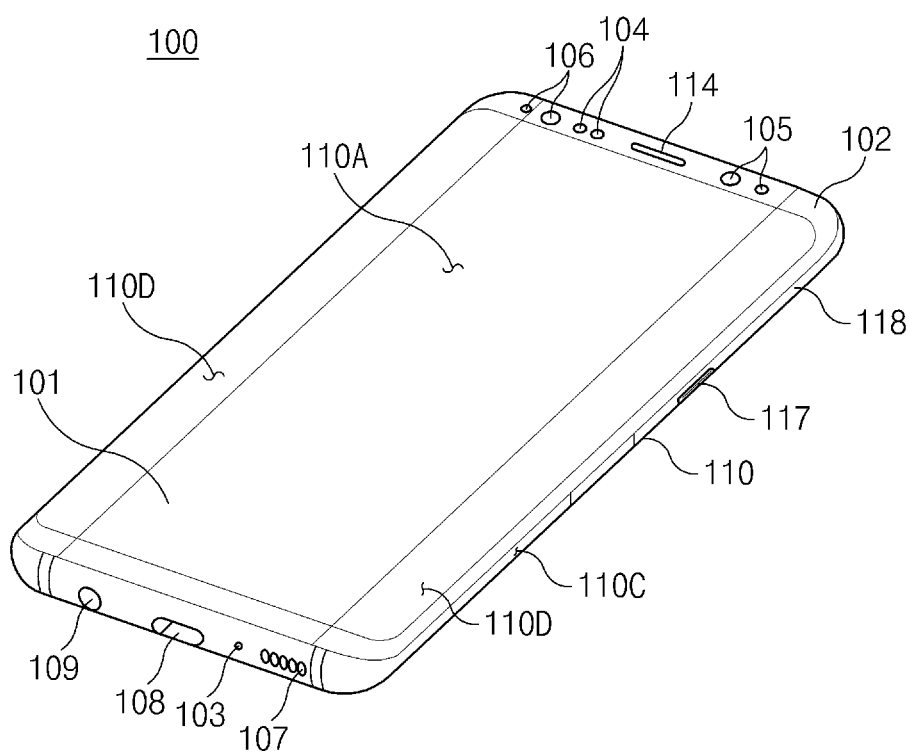
FIG. 1A is a perspective view of a front face of a mobile electronic device according to an embodiment.
Figure 1B:
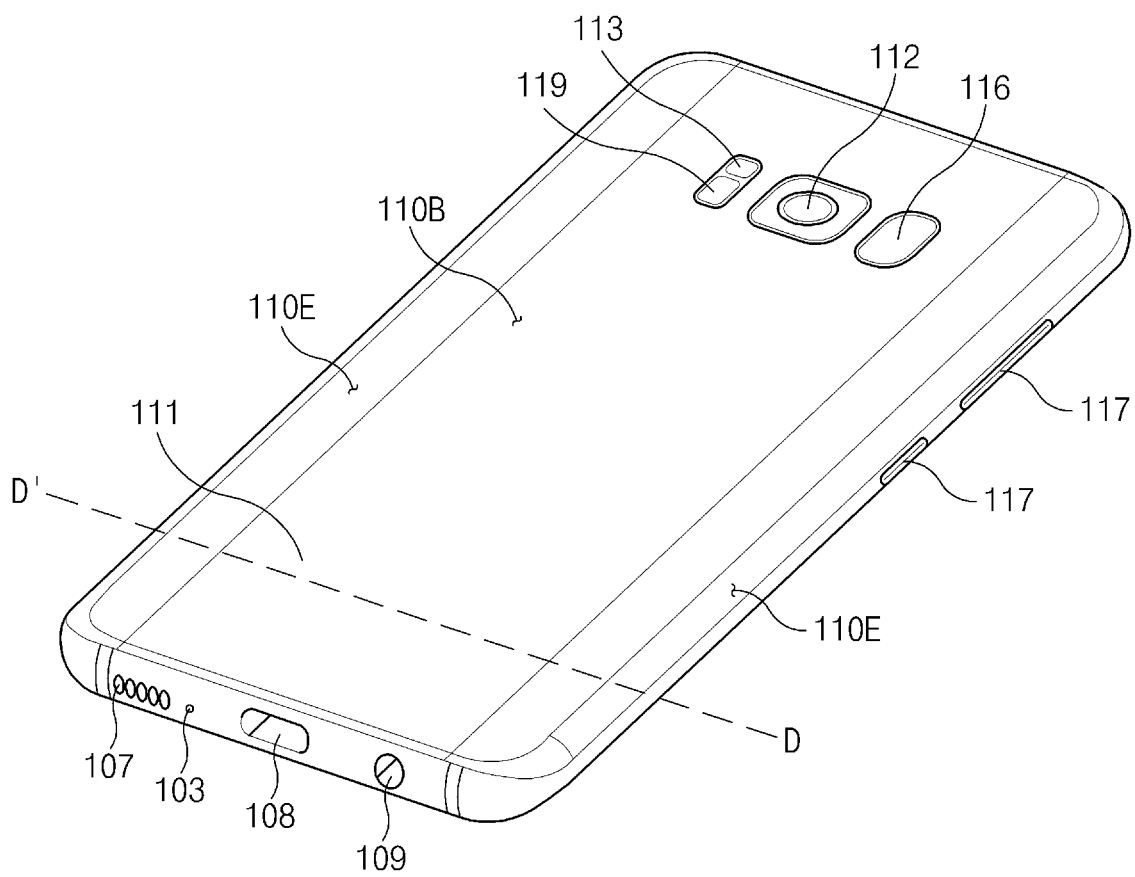
FIG. 1B is a perspective view of a rear face of an electronic device of FIG. 1A.
Figure 2:
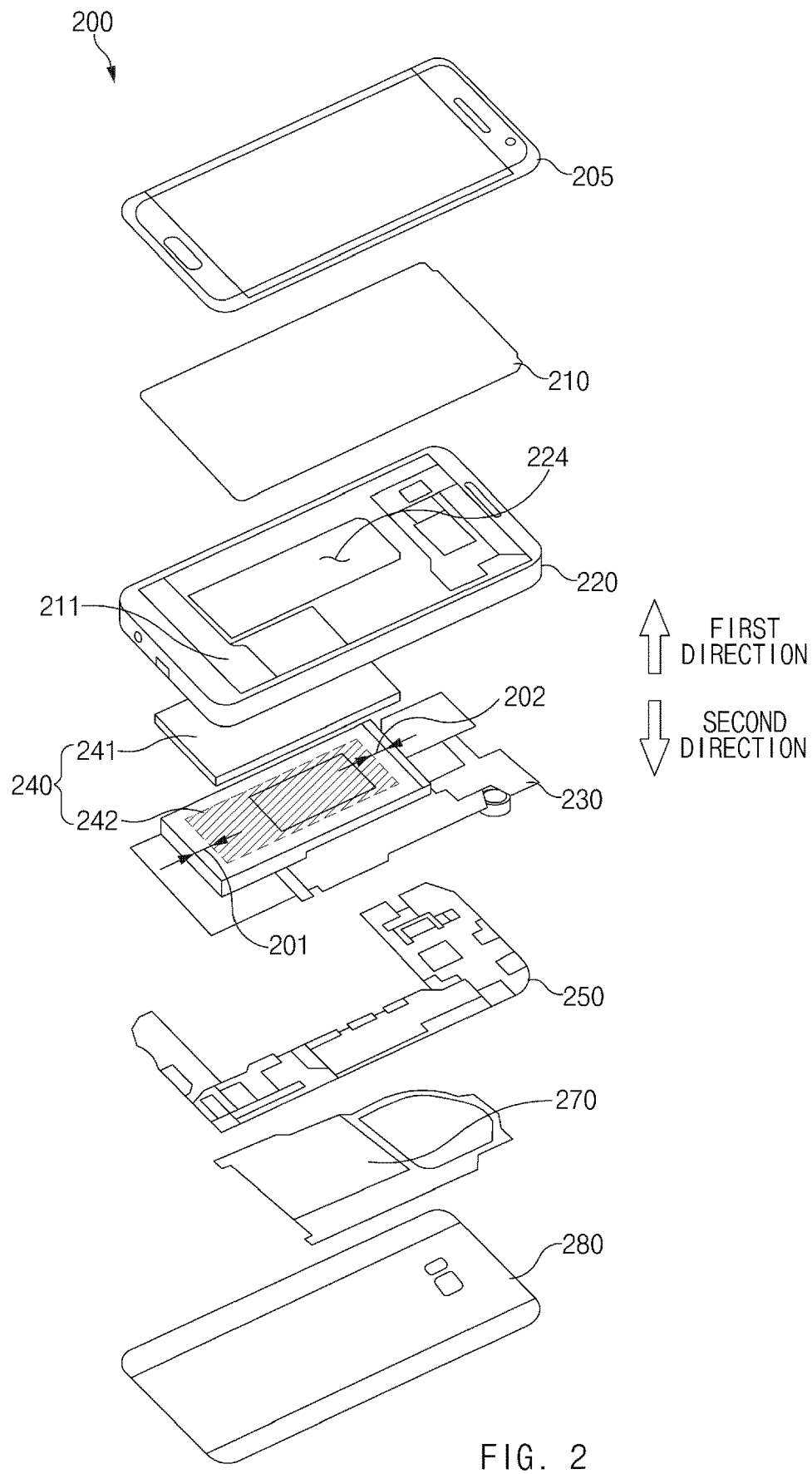
FIG. 2 is an exploded perspective view of an electronic device of FIG. 1A.

FIG. 1A is a perspective view of a front face (or a front surface) of a mobile electronic device according to an embodiment, and FIG. 1B is a perspective view of a rear face (or a rear surface) of the electronic device of FIG. 1A. FIG. 2 is an exploded perspective view of the electronic device of FIG. 1A.

With reference to FIG. 1A to FIG. 2, an electronic device 100 according to an embodiment may include a housing 110 including a first face (or a first surface, or a front face) 110A, a second face (or a second surface, or a rear face) 110B, and a side face 110C (or a side surface) surrounding a space between the first face 110A and the second face 110B. In another embodiment (not shown), the housing may refer to a structure that forms portions of the first face 110A, the second face 110B, and the side face 110C of FIG. 1A. According to an embodiment, the first face 110A may be formed by a front plate 102 (e.g., a glass plate, or a polymer plate including various coating layers), at least a portion of which is substantially transparent. The second face 110B may be formed by a rear plate 111 that is substantially opaque. The rear plate 111 may be formed of, for example, a coated or colored glass, a ceramic, a polymer, a metal (e.g., aluminum, stainless steel (STS), or magnesium), or a combination of at least two of the above-mentioned materials. The side face 110C may be formed by a side bezel structure (or a "side face member") 118 that is coupled to the front plate 102 and the rear plate 111, and includes a metal and/or a polymer. In some embodiments, the rear plate 111 and the side bezel structure 118 may be integrally formed, and may include the same material (e.g., a metal material such as aluminum).

In an embodiment that is illustrated, the front plate 102 may include two first regions 110D at both ends of long edges of the front plate 102 where the front plate 102 is bent and extends seamlessly from the first face 110A toward the rear plate 111. In an illustrated embodiment (see FIG. 1B), the rear plate 111 may include two second regions 110E that are bent and extended seamlessly from the second face 110B toward the front plate 102 at both ends of long edges. In some embodiments, the front plate 102 (or the rear plate 111) may include only one of the first regions 110D (or of the second regions 110E). In another embodiment, a portion of the first regions 110D or a portion of the second regions 110E may not be included. In these embodiments, when viewed from the side face of the electronic device 100, the side bezel structure 118 may have a first thickness (or width) on a side face not including the first region 110D or the second region 110E as described above, and may have a second thickness that is thinner than the first thickness on a side face including the first region 110D or the second region 110E.

According to an embodiment, the electronic device 100 may include at least one of a display 101, audio modules 103, 107, 114, sensor modules 104, 116, 119, camera modules 105, 112, 113, a key input device 117, a light emitting element 106, and connector holes 108, 109. In some embodiments, the electronic device 100 may omit at least one of the components (e.g., the key input device 117, or the light emitting element 106) or additionally include another component.

The display 101 may be exposed, for example, through a substantial portion of the front plate 102. In some embodiments, at least a portion of the display 101 may be exposed through the front plate 102 forming the first face 110A and the first region 110D of the side face 110C. In some embodiments, a shape of outer edges of the display 101 may be substantially the same as a shape of adjacent outer edges of the front plate 102. In another embodiment (not shown), a spacing between the outer edge of the display 101 and the outer edge of the front plate 102 may be substantially uniform along the outer edges in order to increase an exposed area of the display 101.

In another embodiment (not shown), a recess or an opening may be formed in a portion of a screen display region of the display 101. In addition, at least one of the audio module 114, the sensor module 104, the camera module 105, and the light emitting element 106 aligned with the recess or the opening may be included. In another embodiment (not shown), at least one of the audio module 114, the sensor module 104, the camera module 105, the fingerprint sensor 116, and the light emitting element 106 may be provided on a rear face of the screen display region of the display 101. In another embodiment (not shown), the display 101 may be coupled to or adjacent to a touch sensing circuit, a pressure sensor capable of measuring an intensity (pressure) of a touch and/or a digitizer for sensing a stylus pen in a magnetic field manner. In some embodiments, at least a portion of the sensor modules 104, 119 and/or at least a portion of the key input device 117 may be disposed on the first region 110D and/or the second region 110E.

The audio modules 103, 107, and 114 may include a microphone hole 103 and speaker holes 107 and 114. A microphone for acquiring external sound may be disposed inside the microphone hole 103. In some embodiments, a plurality of microphones may be disposed to sense a direction of the sound. The speaker holes 107 and 114 may include the external speaker hole 107 and the receiver hole 114 for a call. In some embodiments, the speaker holes 107 and 114 and the microphone hole 103 may be implemented as a single hole, or a speaker (e.g., a piezo speaker) may be included without the speaker holes 107 and 114.

The sensor modules 104, 116, 119 may generate an electrical signal or a data value corresponding to an internal operating state of the electronic device 100, or an external environmental condition. The sensor modules 104, 116, 119 may include, for example, the first sensor module 104 (e.g., a proximity sensor) disposed on the first face 110A of the housing 110 and/or a second sensor module (not shown) (e.g., a fingerprint sensor) and/or the third sensor module 119 (e.g., an HRM sensor) disposed on the second face 110B of the housing 110 and/or the fourth sensor module 116 (e.g., a fingerprint sensor). The fingerprint sensor may be disposed not only on the first face 110A of the housing 110 (e.g., the display 101) but also on the second face 110B. The electronic device 100 may further include a sensor module that is not shown, for example at least one of a gesture sensor, a gyro sensor, a barometric sensor, a magnetic sensor, an acceleration sensor, a grip sensor, a color sensor, an infrared (IR) sensor, a biosensor, a temperature sensor, a humidity sensor, or the illuminance sensor 104.

The camera modules 105, 112, 113 may include the first camera device 105 disposed on the first face 110A of the electronic device 100, the second camera device 112 and/or the flashlight 113 disposed on the second face 110B. The camera modules 105 and 112 may include one or more lenses, an image sensor and/or an image signal processor. The flashlight 113 may include, for example, a light emitting diode or a xenon lamp. In some embodiments, the two or more lenses (an infrared camera lens, a wide-angle lens, and a telephoto lens) and the image sensors may be disposed on one face of the electronic device 100.

The key input device 117 may be disposed on the side face 110C of the housing 110. In another embodiment, the electronic device 100 may not include some or all of the above-mentioned key input devices 117. Further, the key input device 117 that is not included may be implemented in another form such as a soft key, and the like on the display 101. In some embodiments, the key input device may include the sensor module 116 disposed on the second face 110B of the housing 110.

The light emitting element 106, for example, may be disposed on the first face 110A of the housing 110. The light emitting element 106 may, for example, provide status information of the electronic device 100 in an optical form. In another embodiment, the light emitting element 106 may, for example, provide a light source that is interlocked with an operation of the camera module 105. The light emitting element 106 may include, for example, an LED, an IR LED, and a xenon lamp.

The connector holes 108 and 109 may include the first connector hole 108 capable of receiving a connector (e.g., a USB connector) for transmitting and receiving power and/or data to/from an external electronic device and/or the second connector hole (e.g., an earphone jack) 109 capable of receiving a connector for transmitting and receiving an audio signal to/from the external electronic device.

With reference to FIG. 2, an electronic device 200 may include a side bezel structure 220, a first support member 211 (e.g. a bracket), a front plate 205, a display 210, a printed circuit board 230, a battery structure 240, adhesive 241, a second support member 250 (e.g., a rear case), an antenna 270, and a rear plate 280. In some embodiments, the electronic device 200 may omit at least one of the components (e.g., the first support member 211, or the second support member 250) or additionally include another component. At least one of the components of the electronic device 200 may be the same as or similar to at least one of the components of the electronic device 100 of FIG. 1A or FIG. 1B. Redundant descriptions are omitted below. According to various embodiments, the second support member 250 and the rear plate 280 may be integrated.

The first support member 211 may be disposed within the electronic device 200 and connected to the side bezel structure 220, or may be integrally formed with the side bezel structure 220. The first support member 211 may be formed of, for example, a metal material and/or a non-metallic (e.g., polymer) material. The display 210 may be coupled to one face of the first support member 211, and the printed circuit board 230 may be coupled to the other face thereof. A processor, a memory and/or an interface may be equipped on the printed circuit board 230. The processor may include, for example, at least one of a central processing device, an application processor, a graphics processing device, an image signal processor, a sensor hub processor, or a communication processor.

The memory may include, for example, a volatile memory or a non-volatile memory.

The interface may include, for example, a high definition multimedia interface (HDMI), a universal serial bus (USB) interface, an SD card interface and/or an audio interface. The interface may, for example, electrically or physically connect the electronic device 200 with the external electronic device, and may include a USB connector, an SD card/MMC connector, or an audio connector.

The battery structure 240 may include a battery 242 and an adhesive layer 241. The battery 242 is a device for supplying power to the at least one component of the electronic device 200. The battery 242 may include, for example, a non-rechargeable primary battery, a rechargeable secondary battery, or a fuel cell. At least a portion of the battery 242 may be disposed, for example, substantially coplanar with the printed circuit board 230. The battery 242 may be integrally disposed within the electronic device 200, and may be detachably disposed from the electronic device 200. The battery 242 of the electronic device 200 according to the above-described embodiment can comprise a pouch covering a jelly-roll. The battery structure 240 (or a battery package) may include, for example, the battery 242 and the at least one adhesive layer 241 for fixing the battery 242 to at least one region of an internal housing of the electronic device 200. According to various embodiments, when the battery structure 240 is provided as a separate product, apart from the electronic device, the at least one adhesive layer 241 may be disposed on at least a portion of the front and rear faces of the battery 242, and at least one protective film can cover the adhesive layer 241. The protective film may be removed when the battery structure 242 and adhesive layer 241 are placed in the electronic device.

The adhesive layer 241 may be separated by offsets 201, 202 from top and bottom ends of the battery 242, and disposed onto an outer surface of the battery 242 in an inner region thereof. Sizes of the offsets 201 and 202 may vary depending on an arrangement of a roll fixing tape of the jelly-roll that will be described below. The first offset 201 and the second offset 202 may have the same size.

The antenna 270 may be disposed between the rear plate 280 and the battery structure 240. The antenna 270 may include, for example, a near field communication (NFC) antenna, a wireless charging antenna, and/or a magnetic secure transmission (MST) antenna. The antenna 270 may, for example, communicate in close proximity with the external device, or wirelessly transmit and receive the power required for charging. In another embodiment, an antenna structure may be formed by the side bezel structure 220 and/or a portion of the first support member 211 or a combination thereof.

According to various embodiments, the side bezel structure 220, the first support member 211, and the second support member 250 described above may be at least some of the components of the housing of the electronic device 200. In the following description, the side bezel structure provided with the first support member 211 on one region thereof may be a first structure, and the second support member 250 may be a second structure. Accordingly, a reference numeral of the first structure will be referred to as a reference numeral of the side bezel structure on which the first support member is disposed. A reference numeral of the second structure will be referred to as a reference numeral of the second member.

In this regard, at least a portion of the electronic device 200 may include housings 220, 250 (the first structure 220 (or the first support member 211 and the side bezel structure 220, or a front case, or a front case, or a first case, and the like) and the second structure 250 (or the second support member 250, or a rear face case, a rear case, or a second case, and the like)), the battery structure 240 (e.g., the battery 242 and the adhesive layer 241), the printed circuit board 230, and the display 210. According to various embodiments, the display 210 may be disposed on a first face (e.g., a first directional face) of the first structure 220 (or the first plate), and the battery 242 and adhesive layer 241 may be disposed on a second face (e.g., a second directional face) of the first structure 220. At least a portion of the second structure 250 may be coupled to at least a portion of the first structure 220. The battery 242 and the adhesive layer 241 may be disposed between the first structure 220 and the second structure 250.

The housings 220, 250 may include a part of an outer portion of the electronic device 200. The battery structure 240, the printed circuit board 230, and the like may be disposed on the housings 220, 250. At least a part of the display 210 may be disposed on one region of the housings 220, 250. These housings 220, 250 may include, for example, the first structure 220 in which the display 210 is disposed on one region thereof, and the printed circuit board 230 the battery 242 and the adhesive layer 241 are disposed on the other region thereof, and the second structure 250 (or the second plate) in which the battery 242 is disposed on a rear face thereof.

The first structure 220 may include, for example, the front case. The display 210 may be disposed on a first direction side of the first structure 220 (e.g., an upper direction side of the first structure 220 on the illustrated drawing). The printed circuit board 230 the battery 242 and the adhesive layer 241 may be disposed on a second direction side of the first structure 220 (e.g., a lower direction side of the first structure 220 on the illustrated drawing). The first structure 220 has a hole 224 of a predetermined size penetrating in a up and down direction the first structure 220. The battery 242 and the adhesive layer 241 may be received in the hole 224. Although the hole 224 penetrating in the up and down direction is shown in the illustrated drawing, the disclosure is not limited thereto. The first structure 220 may be free of the hole 224 and have a bottom face facing the battery 242 and the adhesive layer 241. At least a portion of the first structure 220 may be made of a metal material.

The second structure 250 may be coupled to and fixed to the first structure 220. An inner face (e.g., a face facing the first direction side) of the second structure 250 may face the battery 242 and the adhesive layer 241. The rear plate 280 may be disposed on an outer face (e.g., a face facing the second direction side) of the second structure 250.

Figure 3A:
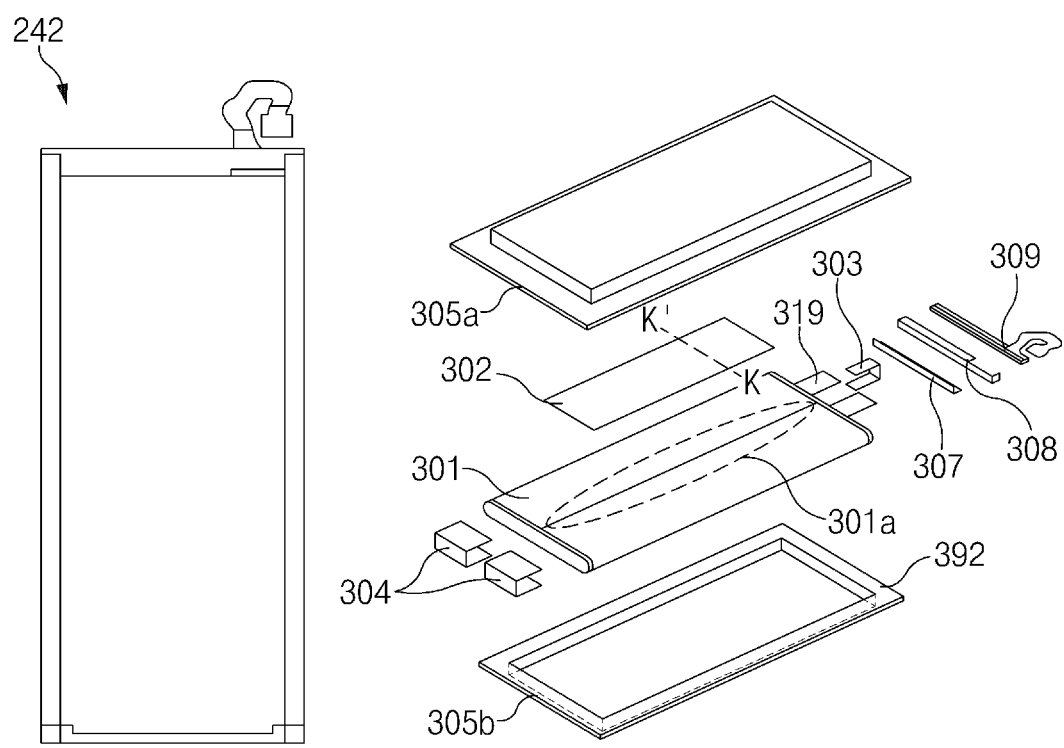
FIG. 3A shows an example of a battery structure according to an embodiment of the disclosure.

FIG. 3A shows an example of a battery structure according to an embodiment of the disclosure.

With reference to FIG. 2 and FIG. 3A, the battery 242 may include a jelly-roll 301, a roll fixing tape 302, a roll top tape 303, a roll bottom tape 304, pouch portion 305a and pouch portion 305b (forming a pouch), a tape PCM 307, a mold PCM 308, or a battery PCB (printed circuit board) 309.

The jelly-roll 301 may be formed by rolling, with a predetermined number of times, a member having an anode substrate and a cathode substrate respectively formed on front and rear faces with respect to the separator. The jelly-roll 301 has an end part 301a as shown. The roll fixing tape 302 may fix the end part 301a so that the end part 301a is not released. The roll fixing tape 302 may be disposed on one face (e.g., top face with reference to the illustrated drawing) of the jelly-roll 301 having a rectangular shape. In one embodiment, the roll fixing tape 302 may be a filled film having a predetermined size and a face.

The pouches 305a and 305b may enclose the jelly-roll 301 therein. The pouches 305a, 305b may include, for example, the first pouch 305a covering an upper portion of the jelly-roll 301 and the second pouch 305b covering a lower portion of the jelly-roll 301. The first pouch 305a and the second pouch 305*b* may respectively include wing portions 392 that may engage each other (engage the first pouch 305*a* and the second pouch 305*b*). The roll fixing tape 302 may be disposed, for example, between the first pouch 305*a* and the jelly-roll 301.

When the jelly-roll 301 is enclosed in the pouches 305*a* and 305*b*, the roll top tape 303 may be disposed between one face of the jelly-roll 301 and an inner face of each of the pouches 305*a* and 305*b*.

The roll top tape 303 may be disposed at a top of the jelly-roll 301 to fix the jelly-roll 301. The roll bottom tape 304 may be disposed at a bottom of the jelly-roll 301 to fix the jelly-roll 301. The jelly-roll 301 may be enclosed inside the pouches 305*a* and 305*b*, and a protection member (e.g., 303, 304) may be disposed to cover edges of the pouches 305*a* and 305*b*. The tape PCM 307, the mold PCM 308, and the battery PCB 309 may be connected to electrodes 319 (e.g., negative and positive electrodes) of the jelly-roll 301, and used for charging or discharging the power of the battery 242 depending on a control of a power management unit. For example, the tape PCM 307, the mold PCM 308, and the battery PCB 309 may be disposed at an outer edge of the pouch, and may be electrically connected to the negative and positive electrodes of the jelly-roll 301 exposed to the outside of the pouches 305*a* and 305*b*. According to an embodiment, the battery PCB 309 may be electrically connected to the electrodes 319 of the jelly-roll 301, and the tape PCM 307 and the mold PCM 308 may be physically disposed at the outer edge of the pouches 305*a* and 305*b*.

As described above, the battery 242 may include the roll fixing tape 302 (e.g., OPS (Oriented Polystyrene) tape) for fixing the jelly-roll 301. The adhesive layer 241 described above in FIG. 2, and the like may be disposed between the outer portion of the battery 242 (e.g., the pouch) and the surrounding structure (e.g., the first structure 220 or the second structure 250) to fix the battery 242 to the surrounding structure. At least one end (e.g. at least one of both opposing vertical ends of the adhesive layer 241 having a rectangular structure) among ends (e.g., four edges when the adhesive layer 241 is rectangular) of the adhesive layer 241 adhered to the outer surface of the battery 242 (e.g., outer face of each of pouches 305*a* and 305*b*) may be aligned with one corresponding end of the roll fixing tape 302. When one end of the roll fixing tape 302 and one end of the adhesive layer 241 are aligned with each other, even though the jelly-roll 301 flows inside the pouches 305*a* and 305*b* by an external pressure, the alignment structure of the roll fixing tape 302 and the adhesive layer 241 may uniformly disperse the external pressure to minimize damage to the pouches 305*a* and 305*b*. In this regard, the roll fixing tape 302 may be disposed between the jelly-roll 301 and an inner wall of each of the pouches 305*a*, 305*b*, and may be adhered to an inner region of each of the pouches 305*a*, 305*b*.

Figure 3B:
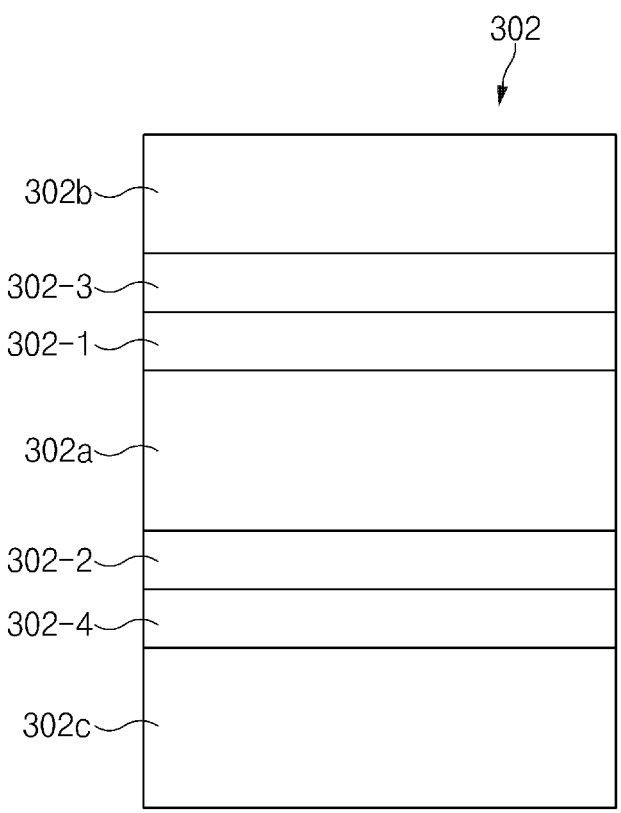
FIG. 3B shows an example of a roll fixing tape structure according to an embodiment of the disclosure.

FIG. 3B shows an example of a roll fixing tape according to an embodiment of the disclosure. In this connection, FIG. 3B is an illustration of an example of a cutting plane along a cut line K'-K in FIG. 3A.

With reference to FIG. 3B, the roll fixing tape 302 may include a substrate layer 302*b*, a barrier layer 302*a*, and a sealant layer 302*c*. In addition, the roll fixing tape 302 may include a DL layer 302-3 and a first treatment layer 302-1 disposed between the substrate layer 302*b* and the barrier layer 302*a*, and a second treatment layer 302-2 and an adhesive layer 302-4 disposed between the barrier layer 302*a* and the sealant layer 302*c*.

The substrate layer 302*b* is a component for securing a moldability of the roll fixing tape 302, and may be formed of, for example, a nylon, a PET, or the like. The substrate layer 302*b* may be disposed to secure an insulation of the roll fixing tape 302 when the battery is constructed. The DL layer 302-3 may be disposed to maintain a lamination strength between the substrate layer 302*b* and the barrier layer 302*a* when shaping the roll fixing tape 302. The DL layer 302-3 may have heat and moisture resistant properties. The first treatment layer 302-1 and the second treatment layer 302-2 may be disposed for preventing a deterioration of an adhesion due to an electrolytic solution of the battery (HF resistance). The barrier layer 302*a* may be applied to improve the formability of the roll fixing tape 302. In addition, the barrier layer 302*a* may be applied to maintain an airtightness of the roll fixing tape 302, and to maintain a steam barrier property. The adhesive layer 302-4 may be applied to maintain the steam barrier property. The adhesive layer 302-4 may provide an adhesion to the barrier layer 302*a* and the sealant layer 302*c*. The adhesive layer 302-4 may have heat resistance and insulation properties. The sealant layer 302*c* may be applied to maintain a strength of a sealing. The sealant layer 302*c* may have heat resistance and insulation properties.

Figure 4:
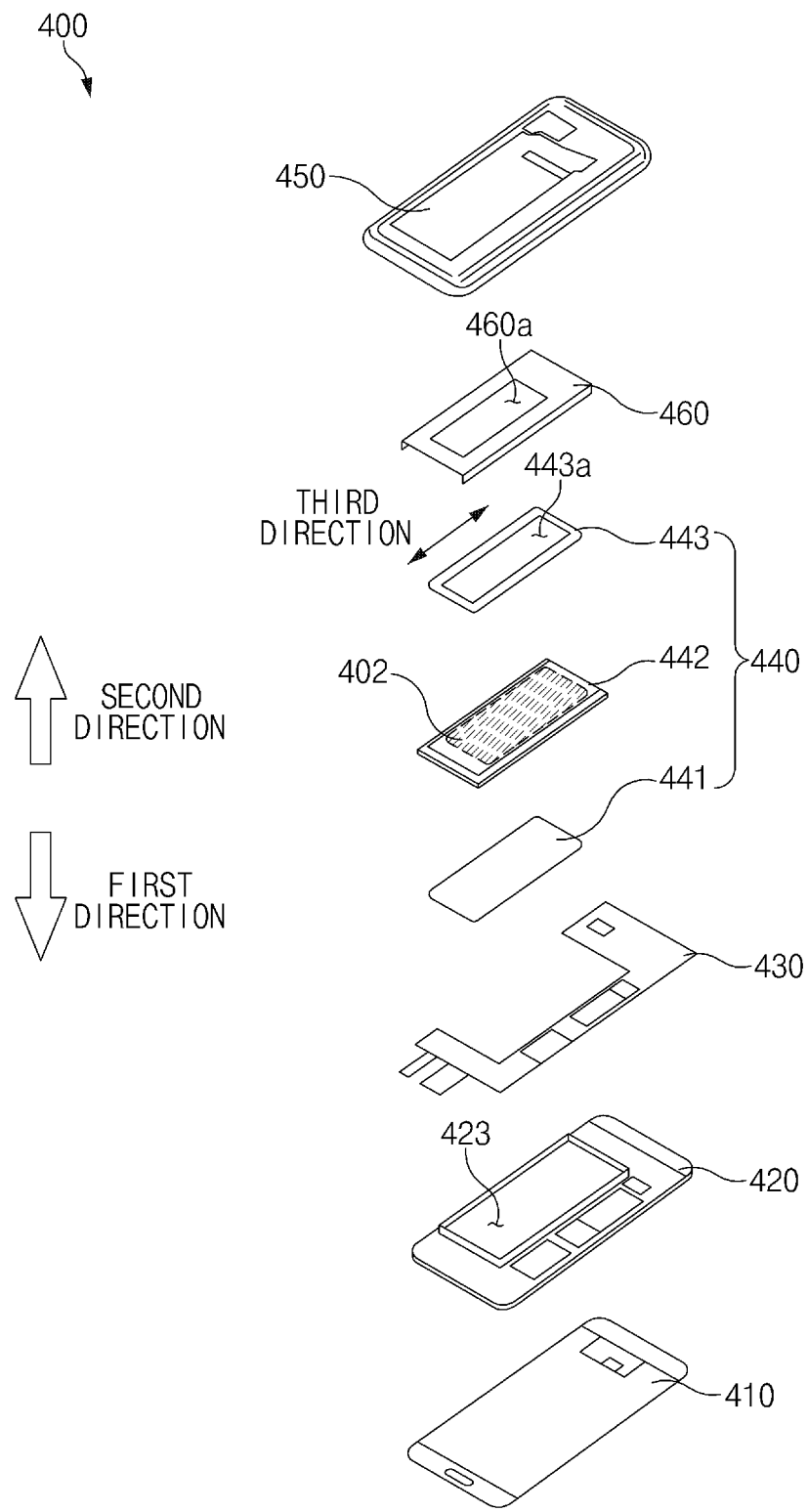
FIG. 4 shows another example of an electronic device including a battery structure according to an embodiment of the disclosure.

FIG. 4 shows another example of an electronic device including the battery 242 and the adhesive layer 241 according to an embodiment of the disclosure.

With reference to FIG. 4, according to an embodiment, an electronic device 400 may include a display 410, a first case 420, a printed circuit board 430, a battery structure 440, a bracket 460, and a second case 450. The first case 420 and the second case 450 can be considered plates.

The display 410 may output at least one screen related to an execution of a function of the electronic device 400. The display 410 may be disposed and fixed on one face (e.g., a face facing a first direction side) of the first case 420.

The first case 420 may include, for example, a front case. At least a portion of the first case 420 may be made of a metal material. The first case 420 may include a receiving space 423 in which at least a portion of the battery 242 and the adhesive layer 241 is received. At least a portion of a bottom face of the receiving space 423 may be adhered to a first adhesive layer 441 included in the battery 242 and the adhesive layer 241. Although the receiving space 423 is shown in a form of a closed-hole in the illustrated drawing, a hole (e.g., a hole passing through the bottom face in a up and down direction) having a width smaller than an entire width of the bottom face of the receiving space 423 may be provided in the bottom face. The receiving space 423 may be provided with a plurality of sidewalls that are recessed than a periphery or disposed at least in different directions.

In certain embodiments, the first adhesive layer 441 and a second adhesive layer 443, may adhere to the battery 442. The first adhesive layer 441 has a certain thickness and area. In addition, the first adhesive layer 441 may have a face smaller than a size of a first face (e.g., a face facing the first direction side) of the battery 442. A center portion of the first adhesive layer 441 may be filled. In addition, an edge portion of the first adhesive layer 441 may be selectively chamfered (chamfered inwardly). The first adhesive layer 441 may have various shapes (e.g., elliptical, polygonal, free-curved, at least partially removed shape, and the like). According to an embodiment, the first adhesive layer 441 may have a relatively long rectangular shape on one side and may be attached to the battery 442 such that a longitudinal edge of the first adhesive layer 441 is aligned with a longitudinal edge of the battery structure 440. According to various embodiments, the first adhesive layer 441 may be spaced a certain distance (e.g., the offsets 201, 202 described in FIG. 2) inward from top and bottom ends (e.g., the top end provided with the battery PCM 309, and the like described in FIG. 3, and the bottom end opposite to the top end) of the battery 442. According to various embodiments, when the battery structure 440 is provided as a separate product, at least one adhesive layer (at least one of 441 and 443) may be disposed on at least a portion of front and rear faces of the battery 442, and at least one protective film (e.g., a first protective film for covering the first adhesive layer 441, a second protective film for covering the second adhesive layer 443) covering the at least one adhesive layer 441 may be provided. The at least one protective film may be removed when the battery structure 440 is disposed in the electronic device.

The battery 442 may have substantially the same components as the battery components described above with reference to FIG. 2 and FIG. 3. For example, the battery 442 may include a jelly-roll having a roll fixing tape 402 attached to one region thereof is enclosed in a pouch. Top and bottom faces of the jelly-roll may be formed in a rectangular shape wider than a side face. The battery 442 may be disposed such that the roll fixing tape 402 faces one face (e.g., a face facing a second direction side). According to various embodiments, a face on which the roll fixing tape 402 of the battery 442 is disposed may be arranged to face the first direction side.

The first adhesive layer 441 may be disposed between the first case 420 and the face of the battery 442 facing the first direction side. The first adhesive layer 441 may secure the battery 442 to the receiving space 423 of the first case 420. The first adhesive layer 441 may have the same shape and size as the roll fixing tape 402. Alternatively, a height (e.g., a length in a longitudinal direction (or a third direction)) of the first adhesive layer 441 may be the same as a height (e.g., a length in the longitudinal direction (or the third direction)) of the roll fixing tape 402. An attachment position of the first adhesive layer 441 on the battery 442 may include a position in which while at least one of top and bottom ends of the first adhesive layer 441 is aligned with at least one of top and bottom ends of the first adhesive layer 441, the first adhesive layer 441 and the roll fixing tape 402 are overlapped with each other in a up and down direction (e.g. in the first direction or in the second direction).

The second adhesive layer 443 may be attached to the face of the battery 442 facing the second direction side. Alternatively, the second adhesive layer 443 may be disposed between the face of the battery 442 facing the second direction side and the bracket 460. The second adhesive layer 443 may be provided in various shapes similar to the first adhesive layer 441, for example. According to an embodiment, the second adhesive layer 443 may be provided in a shape of a polygonal band (e.g., a rectangular band) having a hollow center (or having a first hole 443A in a predetermined size at the center). A size and an edge shape of the second adhesive layer 443 may be the same as the roll fixing tape 402 disposed on an inner region the battery 442 (or inner region of a pouch of the battery 442). Alternatively, a length in a longitudinal direction (or a third direction) of the second adhesive layer 443 may be the same as a length in a longitudinal direction (or the third direction) of the roll fixing tape 402.

The bracket 460 may be disposed between the first case 420 and the second case 450 to cover a periphery of the battery 442 and fix the battery 442. For example, when the battery 442 is received in the receiving space 423 of the first case 420, the bracket 460 may be disposed so as to cover the face of the battery 442 facing the second direction side, and fix the battery 442 based on the second adhesive layer 443.

According to various embodiments, the bracket 460 may be secured to the receiving space 423 of the first case 420 where the battery 442 is received therein. The bracket 460 may have a hollow center (e.g., having a second hole 460A of a predetermined size). A size of the second hole 460A may be smaller than a size of the first hole 443A. The bracket 460 may be at least partially made of a metal material so as to have a predetermined stiffness. Alternatively, the bracket 460 may be provided as a plastic structure. A face of the bracket 460 facing the second direction side may face a face of the second case 450 facing the first direction side, and may be fixed to the face of the second case 450 facing the first direction side.

In the above description, the structure in which the electronic device 400 includes the bracket 460 is illustrated and described, but the disclosure is not limited thereto. For example, the electronic device 400 may have a structure in which the bracket is excluded, as described above with reference to FIG. 2, and the like. In this case, the second adhesive layer 443 may be directly attached to the face of the second case 450 facing the first direction side.

Figure 5:
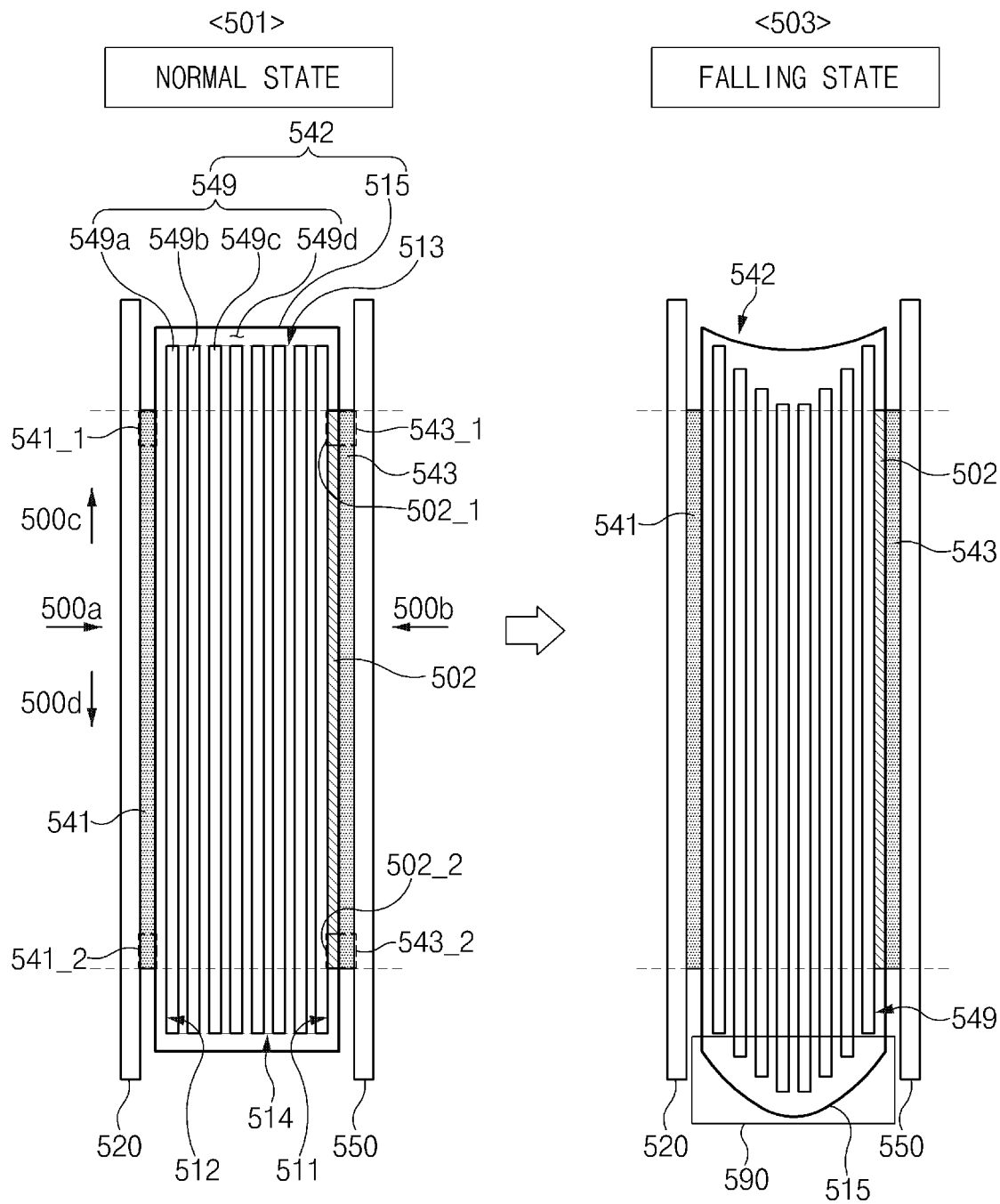
FIG. 5 shows another example of some components of an electronic device according to an embodiment of the disclosure.

FIG. 5 shows another example of some components of an electronic device in a normal state 501 and a falling state 503 according to an embodiment of the disclosure. The illustrated drawing is a view showing an example of a cutting plane along a D'-D cutting line shown in FIG. 1B. For example, the drawing shown in FIG. 5 may be a view including at least a portion of a cross section cut along the D-D' cutting line of FIG. 1B of the first structure 220, the adhesive layer 241, battery 242, and the second structure 250 (or the rear plate 280 integrated with the second structure 250) of the configuration shown in FIG. 2. In the following description, adhesive layers 541 and 543 are disposed on a first face 500a and a second face 500b of a battery 542, respectively. However, the disclosure is not limited thereto. For example, the battery structure of the disclosure may include only the battery 542 and the first adhesive layer 541, or only the battery 542 and the second adhesive layer 543.

With reference to FIG. 5, based on a normal state 501, an electronic device 500 may include housings 520, 550 (or casings, or plates). Further, the housings 520, 550 may include a first structure 520 toward the first face 500a (or the first support member 211 or the side bezel structure 220, or the first case, or the front case described in FIG. 2) and a second structure 550 (the first structure and the second structure can be any planar structure made of material such as glass, polymer, metal, or a combination thereof) toward the second face 500b opposite to the first face 500a (or the second support member 250, or second case, or the rear face case). Alternatively, the second structure 550 may form at least a part of the housing. Alternatively, only the first structure 520 may form the housing, and the second structure 550 may be separately disposed inside the housing. The electronic device 500 may include battery and adhesive layers 541, 542, 543 disposed between the first face 500a and the second face 500b. The battery 542 may include a jelly-roll 549. The jelly-roll 549 may include a positive electrode substrate 549a, a separator film 549b, and a negative electrode substrate 549c, and may further include an electrolyte 549d. According to various embodiments, the electrolyte 549d is a component that is enclosed within a pouch 515. At least a portion of the electrolyte 549d may be disposed in the jelly-roll 549. Alternatively, a portion of the electrolyte 549d may be disposed in the jelly-roll 549, and the remainder may be disposed between the pouch 515 and the jelly-roll 549. Accordingly, the electrolyte 549d may be excluded from the jelly-roll 549 and included in the battery 542. This jelly-roll 549 may include, based on the illustrated drawing, a first outer surface 511 parallel to a rectangular face of the pouch 515, and facing in a first direction (a direction toward the first face 500a) (e.g., a direction from the first structure 520 toward the second structure 550), a second outer surface 512 facing in a second direction opposite to the first direction (a direction toward the second face 500b) (e.g., a direction from the second structure 550 toward the first structure 520), a third outer surface 513 facing in a third direction 500c (e.g. a direction from a fourth outer surface 514 toward the third outer surface 513) perpendicular to the first and second directions, wherein the third outer surface 513 connects the first outer surface 511 and the second outer surface 512, and the fourth outer surface 514 facing in a fourth direction 500d opposite to the third direction (a direction from the third outer surface 513 toward the fourth outer surface 514), wherein the fourth outer surface 514 connects the first outer surface 511 and the second outer surface 512. The jelly-roll 549 may be wrapped by the pouch 515. At least some components of the battery 542 may include the jelly-roll 549 and the pouch 515.

The battery and adhesive layers 541, 542, and 543 may include a polymer layer 502 (or a roll fixing tape), at least a portion of which includes OPS. The polymer layer 502 may be disposed between the pouch 515 and the first outer surface 511 when viewed on the first outer surface 511. According to various embodiments, when viewed on the first outer surface 511, the polymer layer 502 may be disposed at least one of between the pouch 515 and the first outer surface 511, between the pouch 515 and the second outer surface 512, between the pouch 515 and the third outer surface 513, or between the pouch 515 and the fourth outer surface 514.

The first adhesive layer 541 among the battery and adhesive layers 541, 542, and 543 may be disposed between the pouch 515 and the first face 500a to adhere the outer surface of the pouch 515 to an inner wall of the first structure 520. The first adhesive layer 541 may include a first edge 541_1 extending from a center of the first face 500a toward the third outer surface 513, and a second edge 541_2 extending from the center of the first face 500a toward the fourth outer surface 514.

The second adhesive layer 543 among the battery and adhesive layers 541, 542, 543 may be disposed between the pouch 515 and the second face. The second adhesive layer 543 may include a third edge 543_1 extending from a center of the second face 500b toward the third outer surface 513, and a fourth edge 543_2 extending from the center of the second face 500b toward the fourth outer surface 514. According to various embodiments, the first edge 541_1 and the third edge 543_1 may be substantially aligned with each other when viewed from the first outer surface 511. Alternatively, a top end part of the first edge 541_1 and a top end part of the third edge 543_1 may have the same height with respect to a center of the jelly-roll 549 when viewed from the third outer surface 513. The second edge 541_2 and the fourth edge 543_2 may be substantially aligned with each other when viewed from the first outer surface 511. Alternatively, a bottom end part of the second edge 541_2 and a bottom end part of the fourth edge 543_2 may have the same height with respect to a center of the jelly-roll 549 when viewed from the fourth outer surface 514.

According to various embodiments, the polymer layer 502 may include a fifth edge 502_1 parallel to the first outer surface 511 and extending in the direction of the third outer surface 513, and a sixth edge 502_2 parallel to the first outer surface 511 and extending in the direction of the fourth outer surface 514. The first edge 541_1 and the fifth edge 502_1 may be substantially aligned with each other when viewed from the first outer surface 511. Alternatively, the top end part of the first edge 541_1 and a top end part of the fifth edge 502_1 may have the same height with respect to the center of the jelly-roll 549 when viewed from the third outer surface 513 direction. The second edge 541_2 and the sixth edge 502_2 may be substantially aligned with each other when viewed from the first outer surface 511. Alternatively, the bottom end part of the second edge 541_2 and a bottom end part of the sixth edge 502_2 may have the same height with respect to the center of the jelly-roll 549 when viewed from the direction of the fourth outer surface 514.

According to various embodiments, the first structure 520 may include at least a portion of a metal material. At least a portion of the second structure 550 may include glass.

According to various embodiments, when outer edges of the electronic device 500 collide with the ground, a certain object, or the like due to a falling of the electronic device 500, the jelly-roll 549 may be deformed as in a falling state 503. For example, as shown, a central portion of the jelly-roll 549 may be displaced in the fourth direction, and the central portion in the fourth direction of the jelly-roll 549 and the pouch 515 may be deformed 590 to protrude in the fourth direction. According to various embodiments, corresponding to the deformation 590 of one region of the jelly-roll 549 (e.g., the fourth outer surface 514), the other region thereof (e.g., the third outer surface 513) may also be deformed.

As the first adhesive layer 541 and the second adhesive layer 543 coincide with the end parts of the polymer layer 502 (or the roll fixing tape of FIG. 3) while securing the pouch 515 to the first structure 520 and the second structure 550, even though the jelly-roll 549 and the pouch 515 protrude by a predetermined amount in the fourth direction, a stress acting in the fourth direction may be evenly dispersed to prevent the battery 542 from being damaged. Alternatively, a difference in adhesion between a region where the first adhesive layer 541 and the second adhesive layer 543 are attached to the pouch 515 and a region where the polymer layer 502 is attached to an inner wall of the pouch 515 is removed, the battery 542 (and adhesive layers 541, 543) of the disclosure or the electronic device including the battery 542 (and adhesive layers 541, 543) may evenly distribute the stress acting on the deformation of the jelly-roll 549 even though at least a portion of the jelly-roll 549 moves in the fourth direction.

In the above description, the upper and lower portions of the first adhesive layer 541 (e.g. the first edge 541_1 and the second edge 541_2) are aligned with the upper and lower portions of the polymer layer 502 (e.g. the fifth edge 502_1 and the sixth edge 502_2) (heights of the end parts of the respective edges are the same or similar (located within a certain error range) with respect to one face of the pouch 515), but the disclosure is not limited thereto. For example, only the second edge 541_2 of the first adhesive layer 541 may be aligned with the sixth edge 502_2 of the polymer layer 502 (heights spaced upward from the bottom end (e.g., the fourth outer surface 514) of the pouch 515 are the same), and the first edge 541_1 and the fifth edge 502_1 may not be aligned therewith. For example, a height from the top end (e.g., third outer surface 513) of the pouch 515 to the first edge 541_1 and a height from the top end of the pouch 515 to the fifth edge 502_1 may be different from each other. According to various embodiments, only the fourth edge 543_2 of the second adhesive layer 543 and the sixth edge 502_2 of the polymer layer 502 may be aligned with each other, and the third edge 543_1 of the second adhesive layer 543 and the fifth edge 502_1 of the polymer layer 502 may not be aligned with each other. Alternatively, according to various embodiments, the first edge 541_1 of the first adhesive layer 541, the third edge 543_1 of the second adhesive layer 543, and the fifth edge 502_1 of the polymer layer 502 may be located on a same horizontal plane with respect to the top end (e.g., the third outer surface 513) of the pouch 515. At least one of a height from the bottom end (e.g., the fourth outer surface 514) of the pouch 515 to the second edge 541_2 of the first adhesive layer 541, a height from the bottom end of the pouch 515 to the fourth edge 543_2 of the second adhesive layer 543, and a height from the bottom end of the pouch 515 to the sixth edge 502_2 of the polymer layer 502 may be different from the rest.

According to various embodiments, heights of the fourth outer surface 514 of the jelly-roll 549 and the second edge 541_2 of the first adhesive layer 541 (or the fourth edge 543_2 of the second adhesive layer 543 and the sixth edge 502_2 of the polymer layer 502) are different from each other. Thus, when an external pressure is generated, a maximum pressure point is moved to the second edge 541_2 of the first adhesive layer 541 (or the fourth edge 543_2 of the second adhesive layer 543, the sixth edge 502_2 of the polymer layer 502). Therefore, the battery and adhesive layers 541, 542, 543 of the disclosure may minimize an occurrence of wrinkles or an internal deformation due to a flow of the jelly-roll 549. In addition, the battery and adhesive layers 541, 542, and 543 of the disclosure may distribute a pressure due to an external impact as the first adhesive layer 541 and the second adhesive layer 543 align with the polymer layer 502.

According to various embodiments described above, the electronic device 500 according to the embodiment includes the housings 520 and 550, the first structure 520 disposed in the housing, wherein the first structure 520 includes the first face 500a; the second structure 550 disposed in the housing or disposed in a portion of the housing, wherein the second structure 550 includes the second face 500b opposite to the first face, and the battery and adhesive layers 541, 542, and 543 disposed between the first face and the second face, wherein the battery and adhesive layers 541, 542, and 543 includes the jelly-roll 549 including a positive electrode substrate, a separator, and a negative electrode substrate wrapped around the rectangular face, wherein the jelly-roll includes the first outer surface 511 parallel to the rectangular plane and facing in the first direction, the second outer surface 512 facing in the second direction opposite to the first direction, the third outer surface 513 facing in a third direction perpendicular to the first and second directions and to the rectangular face, wherein the third outer surface connects the first outer surface and the second outer surface, and the fourth outer surface 514 facing in a fourth direction opposite to the third direction, wherein the fourth outer surface connects the first outer surface and the second outer surface, wherein the battery structure includes a pouch containing the jelly-roll, wherein the battery and adhesive layers 541, 542, and 543 includes a polymer layer 502 including stretched polystyrene, wherein the polymer layer is disposed between the pouch and the first outer surface or the second outer surface and/or between the third outer surface and the fourth outer surface when viewed from the first outer surface, wherein the first adhesive layer 541 is disposed between and contacting the pouch and the first face, wherein the first adhesive layer includes a first edge extending in parallel with the third outer surface and a second edge extending in parallel with the fourth outer surface when viewed from the first outer surface, and a second adhesive layer 543 disposed between and contacting the pouch and the second face, wherein the second adhesive layer includes a third edge extending in parallel with the third outer surface and a fourth edge extending in parallel with the fourth outer surface when viewed from the first outer surface, wherein the first edge and the third edge are substantially aligned with each other when viewed from the first outer surface, and wherein the second edge and the fourth edge are substantially aligned with each other when viewed from the first outer surface.

According to various embodiments, the polymer layer includes the fifth edge extending in parallel with the third outer surface and the sixth edge extending in parallel with the fourth outer surface when viewed on the first outer surface. The first edge and the fifth edge are substantially aligned with each other when viewed on the first outer surface, and the second edge and the sixth edge are substantially aligned with each other when viewed on the first outer surface.

According to various embodiments, at least a portion of the second structure may include the glass.

According to various embodiments, at least a portion of the first structure may include the metal layer.

Figure 6:
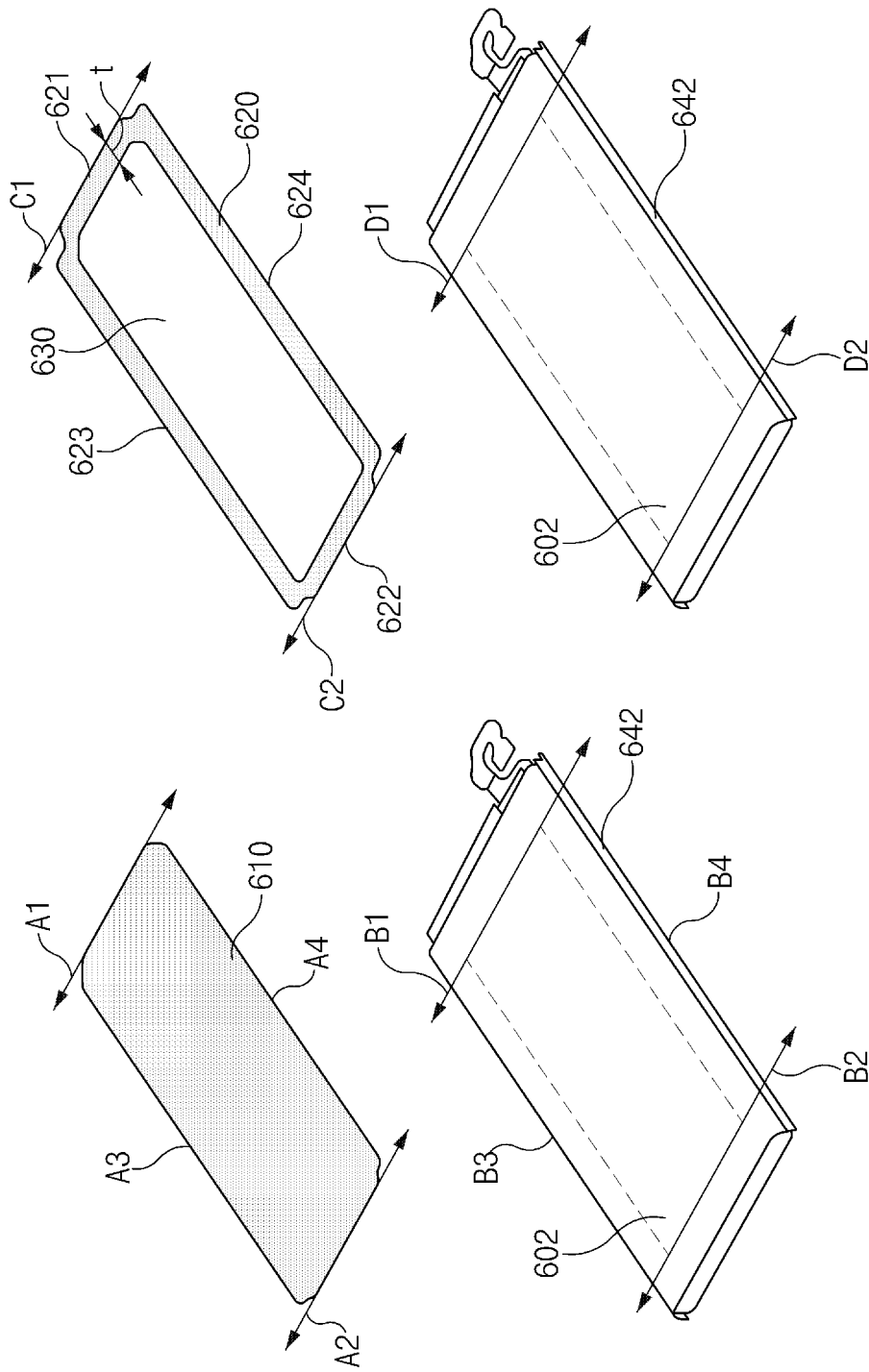
FIG. 6 shows an example of a shape of an adhesive layer according to an embodiment of the disclosure.

FIG. 6 shows an example of a shape of an adhesive layer according to an embodiment of the disclosure.

With reference to FIG. 6, according to an embodiment, there may be provided a battery 642 and a first type adhesive layer 610. The first type adhesive layer 610 may be provided in a wide film form as a whole and a center thereof may be filled. The first type adhesive layer 610 may include a first directional face A1 (or a top face) and a second directional face A2 (or a bottom face). In addition, the first type adhesive layer 610 may include a first side face A3 and a second side face A4 between the first directional face A1 and the second directional face A2. The battery 642 may include a roll fixing tape 602 disposed inside a pouch. The roll fixing tape 602 may include, for example, a third directional face B1 (or a top face) and a fourth directional face B2 (or a bottom face). In addition, the roll fixing tape 602 may include a third side face B3 and a fourth side face B4 between the third directional face B1 and the fourth directional face B2.

While the first type adhesive layer 610 is adhered to a first face of the battery 642 (e.g., a top face with reference to the illustrated drawing), the first directional face A1 (or the top face) of the first type adhesive layer 610 may be aligned with the third directional face B1 of the roll fixing tape 602 (or the polymer layer described in FIG. 5) disposed inside the pouch of the battery 642. Further, while the first type adhesive layer 610 is adhered to the first directional face of the battery 642 (e.g., the top face with reference to the illustrated drawing), the second directional face A2 of the first type adhesive layer 610 may be aligned with the fourth directional face B2 of the roll fixing tape 602 (or the polymer layer described in FIG. 5) disposed inside the pouch of the battery 642.

According to various embodiments, the first side face A3 and the third side face B3 may be aligned. Alternatively, the second side face A4 and the fourth side face B4 may be aligned. Alternatively, the first type adhesive layer 610 may be formed larger than the roll fixing tape 602 so that the first side face A3 and the third side face B3, and the second side face A4 and the fourth side face B4 may not be aligned.

According to various embodiments, there may be provided battery 642 and a second type adhesive layer 620. The second-type adhesive layer 620 may be provided in a wide film form as a whole and a center thereof may be emptied (e.g., a hole 630 of a certain size may be disposed). The second type adhesive layer 620 may include, for example, a first side portion 621, a second side portion 622, a third side portion 623, and a fourth side portion 624. The first side portion 621 and the second side portion 622 may be disposed opposite to each other around the hole 630, and the third side portion 623 and the fourth side portion 624 may be disposed opposite to each other around the hole 630. The first side portion 621 and the second side portion 622 may have the same or different shapes and sizes. The third side portion 623 and the fourth side portion 624 may have the same or different shapes and sizes. The second type adhesive layer 620 may include a fifth directional face C1, a sixth directional face C2, and left and right side faces between the fifth directional face C1 and the sixth directional face C2. The first side portion 621 and the second side portion 622 may be formed such that a thickness (t) gradually decreases from a center portion toward an edge with respect to an inner face of the side portions 621 and 622. Alternatively, an outer edge portion of at least one of the first side portion 621 and the second side portion 622 may have a shape that has been sheared in one direction (e.g., in a second side portion 622 direction at the first side portion 621, and in a first side portion 621 direction at the second side portion 622).

The roll fixing tape 602 is disposed inside the pouch of the battery 642, and may include a seventh directional face D1 and an eighth directional face D2. The roll fixing tape 602 may include left and right side faces between the seventh directional face D1 and the eighth directional face D2.

The fifth directional face C1 of the second type adhesive layer 620 and the roll fixing tape 602 may be arranged in parallel in a up and down direction. The sixth directional face C2 of the second type adhesive layer 620 and the eighth directional face D2 of the roll fixing tape 602 may be arranged in parallel in the up and down direction. The left and right side faces of the second type adhesive layer 620 and the left and right side faces of the roll fixing tape 602 may be aligned or not aligned in the up and down direction based on sizes and shapes.

The battery may include a jelly-roll, the roll fixing tape disposed on one region of the jelly-roll, and a pouch containing the jelly-roll and the roll fixing tape. The at least one adhesive layer includes the first adhesive layer disposed between and attached to one face of the pouch of the battery. One end of the first adhesive layer and one end of the roll fixing tape face in the same direction while the first adhesive layer and the roll fixing tape vertically sandwich the one face of the pouch therebetween. Alternatively, the one end of the first adhesive layer and the one end of the roll fixing tape vertically sandwich the one face of the pouch of the battery therebetween may be aligned with each other based on the up and down direction.

Figure 7:
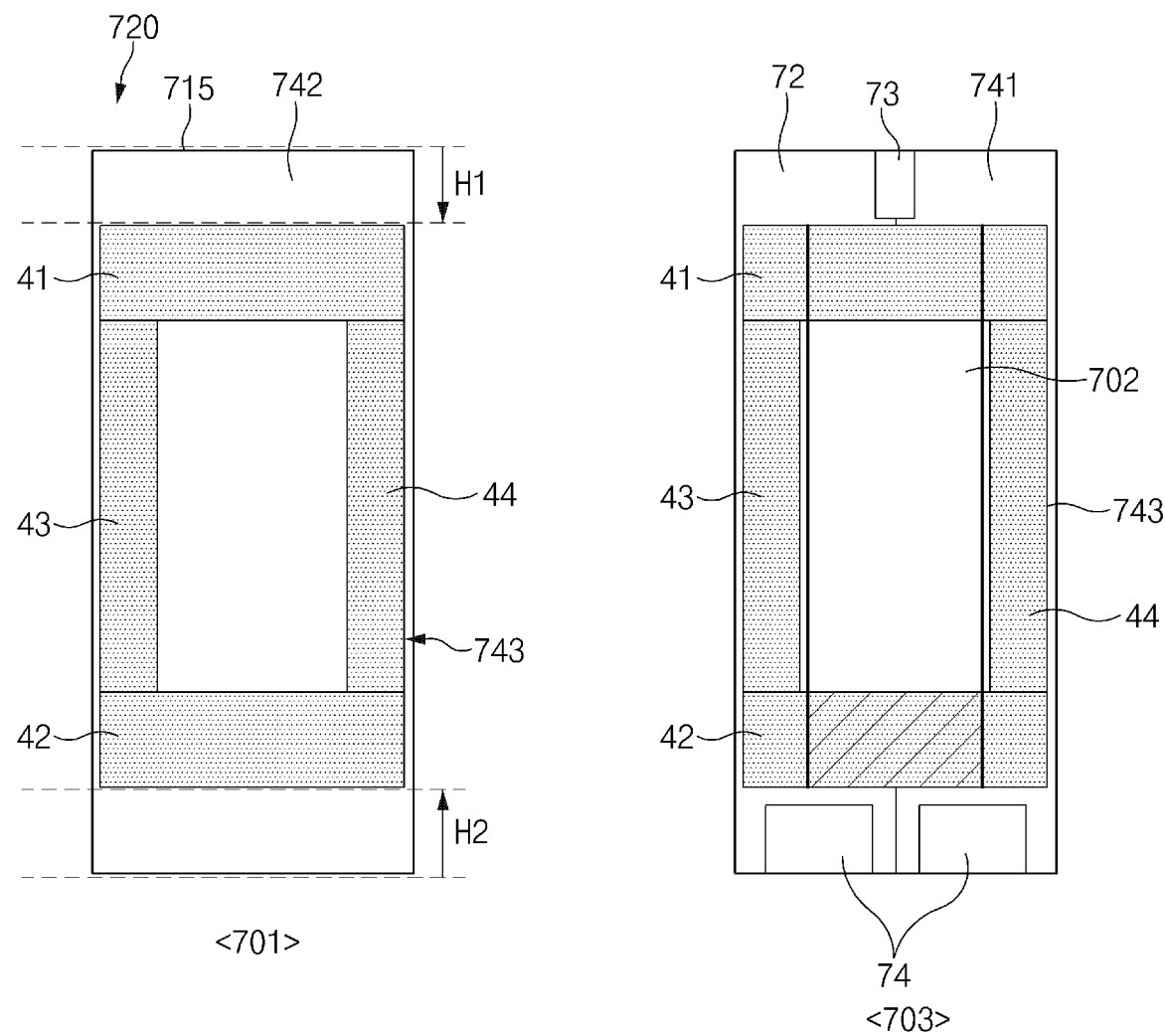
FIG. 7 shows another shape of a battery structure according to an embodiment of the disclosure.

FIG. 7 shows another shape of a battery structure according to an embodiment of the disclosure. In the illustrated drawing, a status 701 is a view for showing a structure in which an adhesive layer is disposed on a pouch wrapping a jelly-roll, and a status 703 is a view for explaining a vertical alignment between the adhesive layer and a roll fixing tape in which the pouch is removed.

With reference to FIG. 7, as in the status 701, a battery structure 720 may include a battery 742 and an adhesive layer 743. At least a portion of the battery 742 may include a pouch 715 having a jelly-roll 741 enclosed therein. The adhesive layer 743 may be disposed on one region of an outer face of the pouch 715.

The adhesive layer 743 may be in a form of a band having a hollow center, and for example, may include a first side portion 41, a second side portion 42, a third side portion 43, and a fourth side portion 44. The first side portion 41, the second side portion 42, the third side portion 43, and the fourth side portion 44 may be connected to each other to form a single body. The first side portion 41 may be spaced from a top end of the battery 742 by a first length H1, and attached to the battery 742. The second side portion 42 may be disposed opposite the first side portion 41 with a center of the battery 742 therebetween. The second side portion 42 may be spaced from a bottom end of the battery 742 by a second length H2, and attached to the battery 742. The first length H1 and the second length H2 may be the same. Widths of the first side portion 41 and the second side portion 42 may be the same. The third side portion 43 may be disposed between the first side portion 41 and the second side portion 42, and may be disposed at one region of the battery 742 (e.g., a left edge based on the illustrated drawing). The fourth side portion 44 may be disposed between the first side portion 41 and the second side portion 42, and may be disposed on the other region of the battery 742 (e.g., a right edge based on the illustrated drawing). The third side portion 43 and the fourth side portion 44 may have the same thickness.

According to various embodiments, as in the status 703, at least a portion of the battery structure 720 may include the jelly-roll structure 741 and the adhesive layer 743. In this connection, the status 703 is a status in which the pouch 715 wrapping the jelly-roll 741, and having the adhesive layer 743 disposed on an outer face thereof is removed as described above.

The jelly-roll 741 may include a jelly-roll 72, a roll top tape 73 disposed at a top thereof and a roll bottom tape 74. As described above, the adhesive layer 743 may be in a form of a band having a hollow center, and for example, may include the first side portion 41, the second side portion 42, the third side portion 43, and the fourth side portion 44. A roll fixing tape 702 may be disposed on the jelly-roll 741. A top of the first side portion 41 may be aligned with a top of the roll fixing tape 702. Alternatively, a position of a top end part of the first side portion 41 on the outer face of the pouch 715 may be the same as a position of a top end part of the roll fixing tape 702 on an inner face of the pouch 715. A bottom of the second side portion 42 may be aligned with a bottom of the roll fixing tape 702. Alternatively, a position of a bottom end part of the second side portion 42 on the outer face of the pouch 715 may be the same as a position of a bottom end part of the roll fixing tape 702 on the inner face of the pouch 715. According to various embodiments, an inner region of the third side portion 43 and an inner region of the fourth side portion 44 may be disposed so as to be aligned with left and right edges of the roll fixing tape 702.

Figure 8:
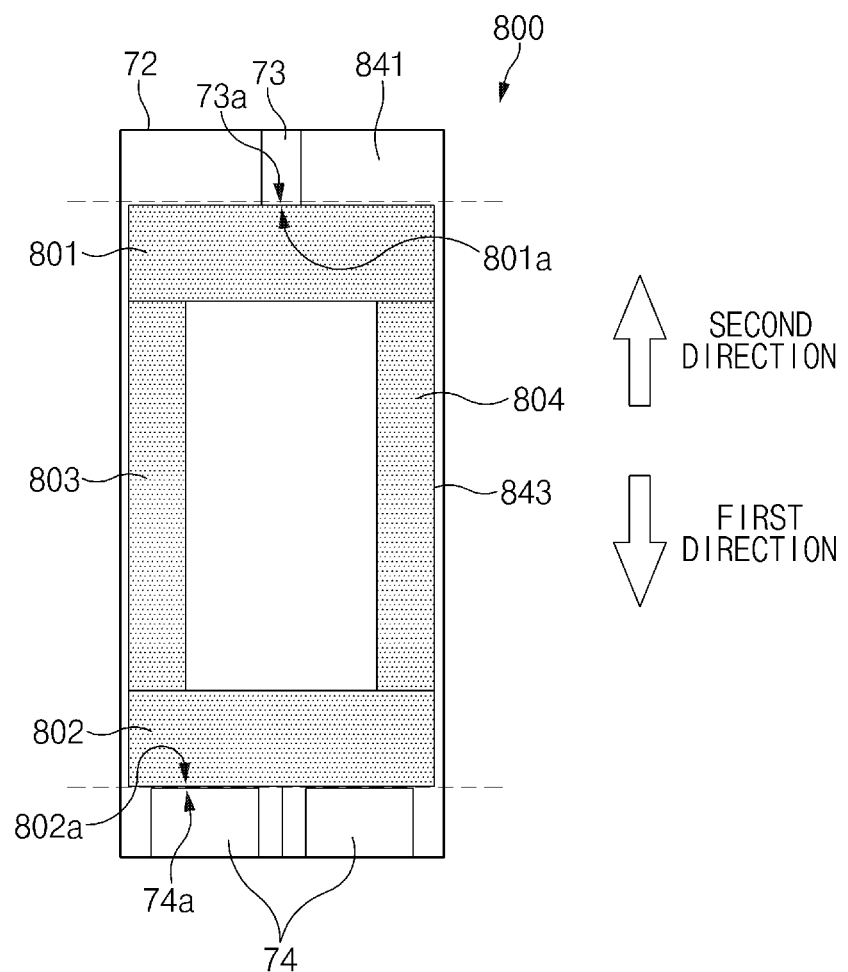
FIG. 8 shows still another shape of a battery structure according to an embodiment of the disclosure.

FIG. 8 illustrates a positional relationship between a pouch internal component (e.g., a jelly-roll) and an adhesive layer, as described above in FIG. 7. FIG. 8 shows a state in which the pouch surrounding the jelly-roll is removed.

With reference to FIG. 8, at least a portion of the battery structure 800 may include a jelly-roll structure 841 and an adhesive layer 843. Additionally, as previously described in FIG. 7, a pouch surrounding the jelly-roll structure 841 is further included in the battery structure 800. Thus, the adhesive layer 843 may be attached to an outer face of the pouch.

The jelly-roll 841 may include a jelly-roll 72 (e.g., a positive electrode substrate, a negative electrode substrate, a separator, and the like), the roll top tape 73 for inhibiting a flow of the jelly-roll 72, and the roll bottom tape 74 for inhibiting the flow of the jelly-roll 72 at a bottom end. The adhesive layer 843 may be provided in a form of a band having a hollow center. For example, the adhesive layer 843 may include a first side portion 801, a second side portion 802, a third side portion 803, and a fourth side portion 804. The first side portion 801 and the second side portion 802 have the same thickness, and are spaced apart from each other by a certain distance. In addition, the first side portion 801 and the second side portion 802 may be attached to upper and lower portions of the jelly-roll 841, respectively. The third side portion 803 and the fourth side portion 804 have the same thickness, and are spaced apart from each other by a certain distance. In addition, third side portion 803 and the fourth side portion 804 may be attached to left and right side portions of the jelly-roll 841, respectively.

A top end 801a of the first side portion 801 may be aligned with an end part 73a of the roll top tape 73 facing a first direction. A bottom end 802a of the second side portion 802 may be aligned with an end part 74a of the roll bottom tape 74 facing a second direction side.

According to various embodiments described above, an electronic device according to an embodiment may include a display (e.g., 210 in FIG. 2), a first structure (e.g., 220 in FIG. 2) having opposing first and second faces, wherein the display is disposed on the first face, and a battery structure disposed on the second face, and a second structure (e.g. 250 in FIG. 2) coupled to the second face of the first structure. The battery structure (e.g. 240 in FIG. 2, 440 in FIG. 4, a battery structure in FIG. 5 to FIG. 12) may include a battery and at least one adhesive layer (e.g., the adhesive layer in FIG. 2, the adhesive layer in FIG. 4, and at least one of adhesive layers in FIG. 5 to FIG. 12). The battery may include a jelly-roll, a roll fixing tape disposed on one region of the jelly-roll, and a pouch containing the jelly-roll and the roll fixing tape. The at least one adhesive layer may include a first adhesive layer disposed between and attached to one face of the pouch of the battery and the first structure. One end of the first adhesive layer and one end of the roll fixing tape face in the same direction while the first adhesive layer and the roll fixing tape vertically sandwich the one face of the pouch therebetween.

According to various embodiments, the other end of the first adhesive layer may be aligned with the other end of the roll fixing tape.

According to various embodiments, one axial length (or a first direction length) of the roll fixing tape and one axial length (or a first direction length) of the first adhesive layer may be the same.

According to various embodiments, the first adhesive layer includes a filled film having a predetermined size and face.

According to various embodiments, the first adhesive layer may include a hollow band.

According to various embodiments, the first adhesive layer may include a first side portion spaced by a predetermined distance inwardly from one side end of the battery, a second side portion opposite to the first side portion about a center of the battery, wherein the second side portion is spaced apart from the first side portion by a predetermined distance, a third side portion connecting one side edge of the first side portion and one side edge of the second side portion, and a fourth side portion connecting the other side edge of the first side portion and the other side edge of the second side portion.

According to various embodiments, the first side portion and the second side portion may have the same width.

According to various embodiments, the third side portion and the fourth side portion may have the same width.

According to various embodiments, a top end of the first side portion may be aligned with one end of the roll fixing tape.

According to various embodiments, a bottom end of the second side portion may be aligned with the other end of the roll fixing tape.

According to various embodiments, an inner face of the third side portion and a first side edge of the roll fixing tape may be aligned with each other.

According to various embodiments, an inner face of the fourth side portion and a second side edge of the roll fixing tape may be aligned with each other.

According to various embodiments, the electronic device may further include a second adhesive layer disposed between the second structure and the battery.

According to various embodiments, one end of the second adhesive layer and one end of the roll fixing tape may face in the same direction.

According to various embodiments, the other end of the second adhesive layer and the other end of the roll fixing tape may face in the same direction.

According to various embodiments, one axial length of the second adhesive layer and one axial length of the roll fixing tape may be same.

Figure 9:
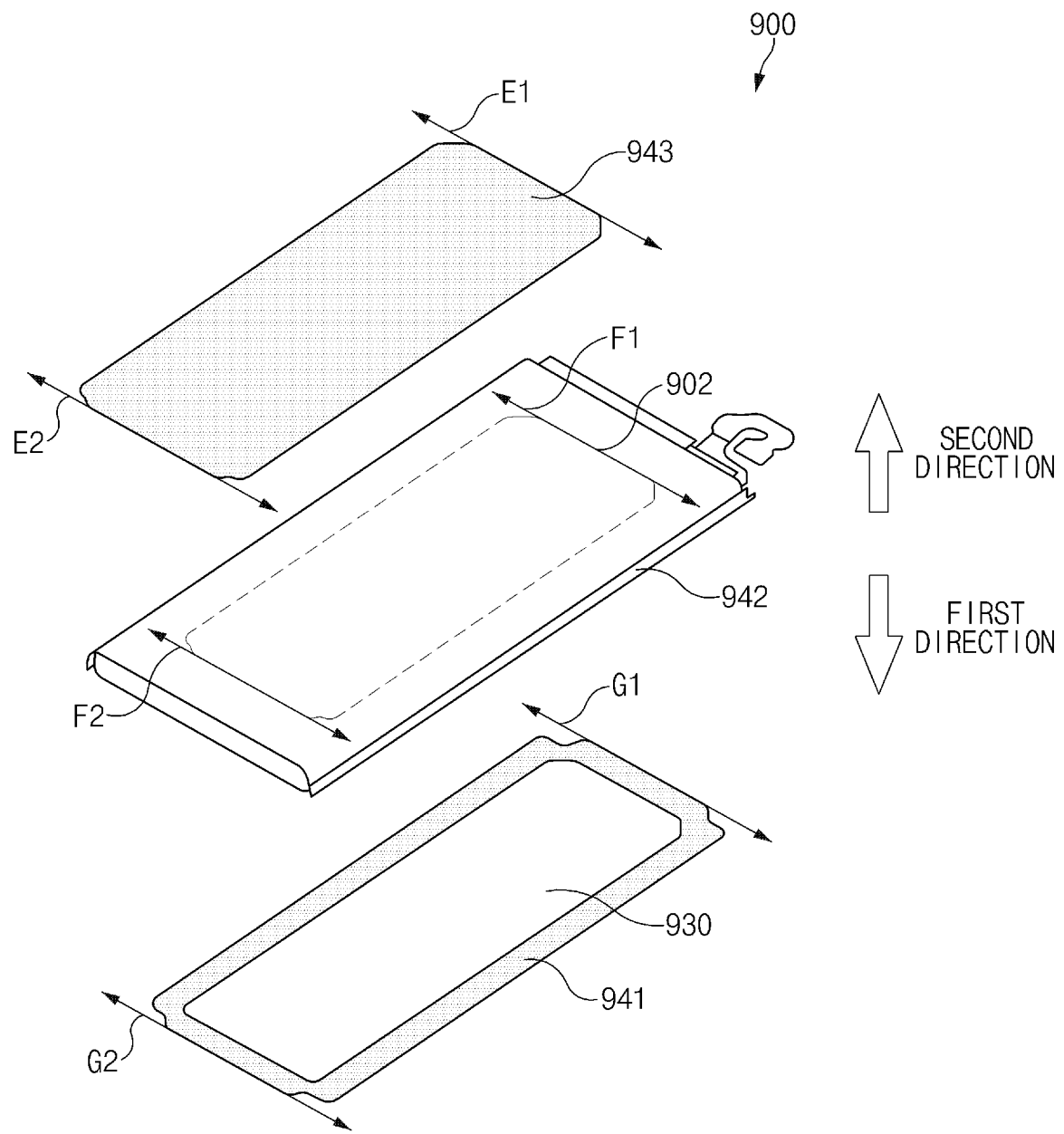
FIG. 9 shows an example of a battery structure having a plurality of adhesive layers according to an embodiment of the disclosure.

FIG. 9 shows an example of a battery structure having a plurality of adhesive layers according to an embodiment of the disclosure.

With reference to FIG. 9, a battery structure 900 according to an embodiment may include a battery 942, a first adhesive layer 941, and a second adhesive layer 943.

The first adhesive layer 941 may be disposed on a first direction side of the battery 942. At least a portion of one region (e.g., a top face) of the first adhesive layer 941 may be attached to a first directional face of the battery 942, and at least a portion of the other region (e.g., a bottom face) of the first adhesive layer 941 may be attached to other structures (e.g., the front case of the electronic device 200, 400). The first adhesive layer 941 may be provided in a form having a hollow center similar to other adhesive layers described above (e.g., the second adhesive layer in FIG. 6 and the adhesive layers in FIG. 7). For example, the first adhesive layer 941 may be provided with a central hole 930. When the battery 942 is swollen, the swollen portion of the battery 942 may enter the hole 930 (e.g., a swelling hole). The first adhesive layer 941 may include a first directional face G1 (or a top face of the first adhesive layer 941) and a second directional face G2 (or a bottom face of the first adhesive layer 941).

The battery 942 may include a pouch in which a roll fixing tape 902 is disposed on one region of a jelly-roll. The roll fixing tape 902 may be disposed, for example, on a top face of the battery 942 facing a second direction side. The roll fixing tape 902 may include a third directional face F1 (or a top face of the roll fixing tape 902) and a fourth directional face F2 (or a bottom face of the roll fixing tape 902).

The second adhesive layer 943 may have a certain size and a face, and may be disposed on a second direction side of the battery 942. The second adhesive layer 943 may have a center-filled shape. The second adhesive layer 943 may have a fifth directional face E1 (or a top face of the second adhesive layer 943) and a sixth directional face E2 (or a bottom face of the second adhesive layer 943).

The first directional face G1 of the first adhesive layer 941 may be disposed in alignment with the third directional face F1 of the roll fixing tape 902 while being attached to the first directional face of the battery 942. The fifth directional face E1 of the second adhesive layer 943 may be disposed in alignment with the third directional face F1 of the roll fixing tape 902 while being attached to the second directional face of the battery 942.

According to various embodiments, the second directional face G2 of the first adhesive layer 941 may be disposed in alignment with the fourth directional face F2 of the roll fixing tape 902 while being attached to the first directional face of the battery 942. The sixth directional face E2 of the second adhesive layer 943 may be disposed in alignment with the fourth directional face F2 of the roll fixing tape 902 while being attached to the second directional face of the battery 942.

Figure 10:
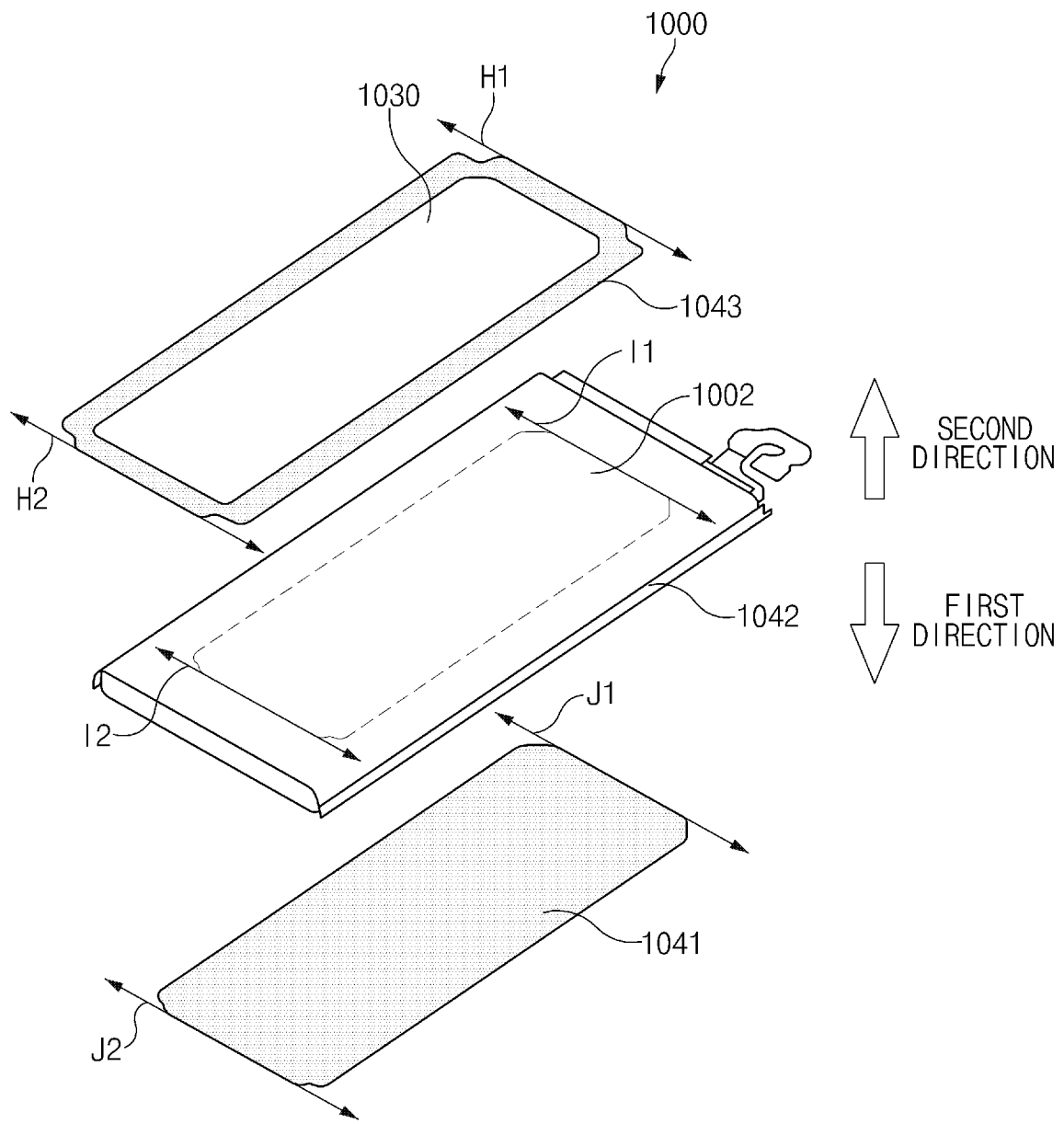
FIG. 10 shows another example of a battery structure having a plurality of adhesive layers according to an embodiment of the disclosure.

FIG. 10 shows another example of a battery structure having a plurality of adhesive layers according to an embodiment of the disclosure.

With reference to FIG. 10, a battery structure 1000 according to an embodiment may include a battery 1042, a first adhesive layer 1041, and a second adhesive layer 1043.

The first adhesive layer 1041 may be disposed on a first direction side of the battery 1042 (or below the battery 1042). At least a portion of a face of the first adhesive layer 1041 facing a second direction side may be attached to a face of the battery 1042 facing the first direction. The first adhesive layer 1041 may have a flat, predetermined sized face with filled center portion. According to an embodiment, a shape and a size of at least one region (e.g., top end and bottom end) of the first adhesive layer 1041 may be the same as a shape and a size of at least one region (e.g., top end and bottom end) of the roll fixing tape disposed within the battery 1042.

The battery 1042 may include a pouch in which a jelly-roll having one region fixed by a roll fixing tape is enclosed. The battery 1042 may have, for example, one face in a rectangular shape, and may have a hexahedron. At least one face of the hexahedron may have a curved shape. Alternatively, boundary regions between faces of the hexahedron may be curved (formed by curved faces). One face of the first adhesive layer 1041 may be attached to the face of the battery 1042 facing the first direction, and a face of the second adhesive layer 1043 may be attached to a face of the battery 1042 facing the second direction side.

The second adhesive layer 1043 may be disposed on the second direction side of the battery 1042 (or above the battery 1042). The second adhesive layer 1043 may be provided in a shape similar to the first adhesive layer 1041 illustrated in FIG. 9, for example. For example, the second adhesive layer 1043 may have a hole 1030 (or a swelling hole) of a predetermined size at a center portion thereof. One side length (e.g., a length from a top end to a bottom end) of the second adhesive layer 1043 and one side length (e.g., a length from a top end to a bottom end) of the roll fixing tape (e.g., the roll fixing tape 902 in FIG. 9) disposed on the battery 1042 may be the same.

According to various embodiments, a first directional face J1 of the first adhesive layer 1041 and a second directional face H1 of the second adhesive layer 1043 may be aligned with a first directional face I1 of the battery 1042 based on the first direction or the second direction. According to various embodiments, a fourth directional face J2 of the first adhesive layer 1041 and a fifth directional face H2 of the second adhesive layer 1043 may be aligned with a sixth directional face 12 of the battery 1042 based on the first direction or the second direction.

Figure 11:
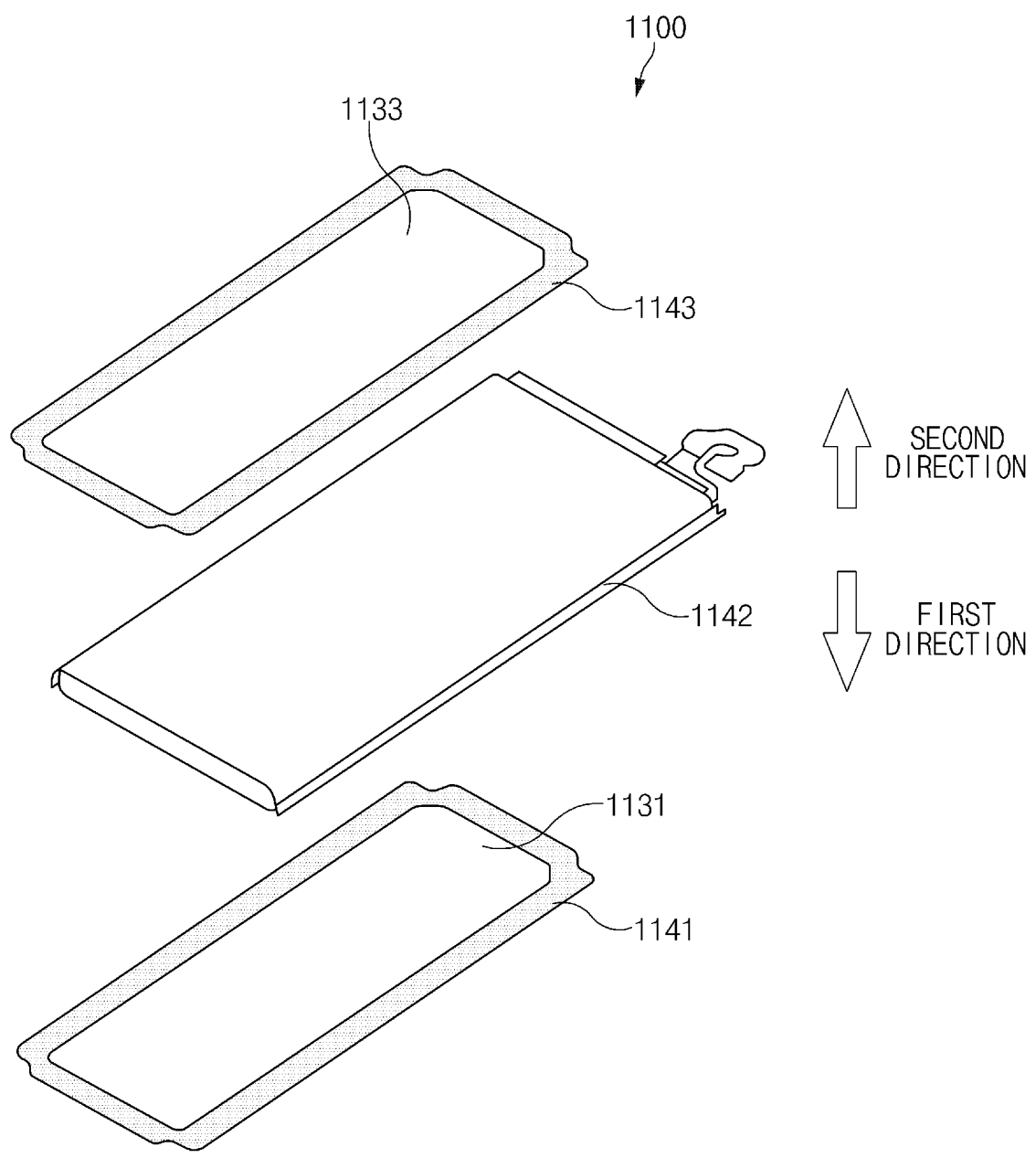
FIG. 11 shows an example of a battery structure having the same type of adhesive layers according to an embodiment of the disclosure.

FIG. 11 shows an example of a battery structure having the same type of adhesive layers according to an embodiment of the disclosure.

With reference to FIG. 11, a battery structure 1100 according to an embodiment may include a first adhesive layer 1141, a battery 1142, and a second adhesive layer 1143.

The battery 1142 includes a pouch in which a jelly-roll is enclosed. In addition, a roll fixing tape for preventing jelly-roll loosening may be disposed on one region of the jelly-roll.

The first adhesive layer 1141 may be provided with a first hole 1131 having a predetermined size on a hollow center portion thereof. The first adhesive layer 1141 may be in a rectangular band shape. At least a portion of the first adhesive layer 1141 may be attached to a face of the battery 1142 facing a first direction side.

The second adhesive layer 1143 may have the same shape and size as the first adhesive layer 1141. For example, the second adhesive layer 1143 may include a second hole 1133 on a hollow center portion thereof. A position of the second adhesive layer 1143 on a surface of the battery 1142 may be different from that of the first adhesive layer 1141. At least a portion of the second adhesive layer 1143 may be attached to a top face of the battery 1142 facing a second direction side. While an outer portion of the battery 1142 is deformed in up and down direction, the deformed outer portion of the battery 1142 may enter the first hole 1131 and the second hole 1133. As previously described in other figures (e.g., FIG. 6, FIG. 7, and the like), top and bottom ends of the first adhesive layer 1141 and top and bottom ends of the second adhesive layer 1143 may be aligned with top and bottom ends of the roll fixing tape disposed within the battery 1142.

Figure 12:
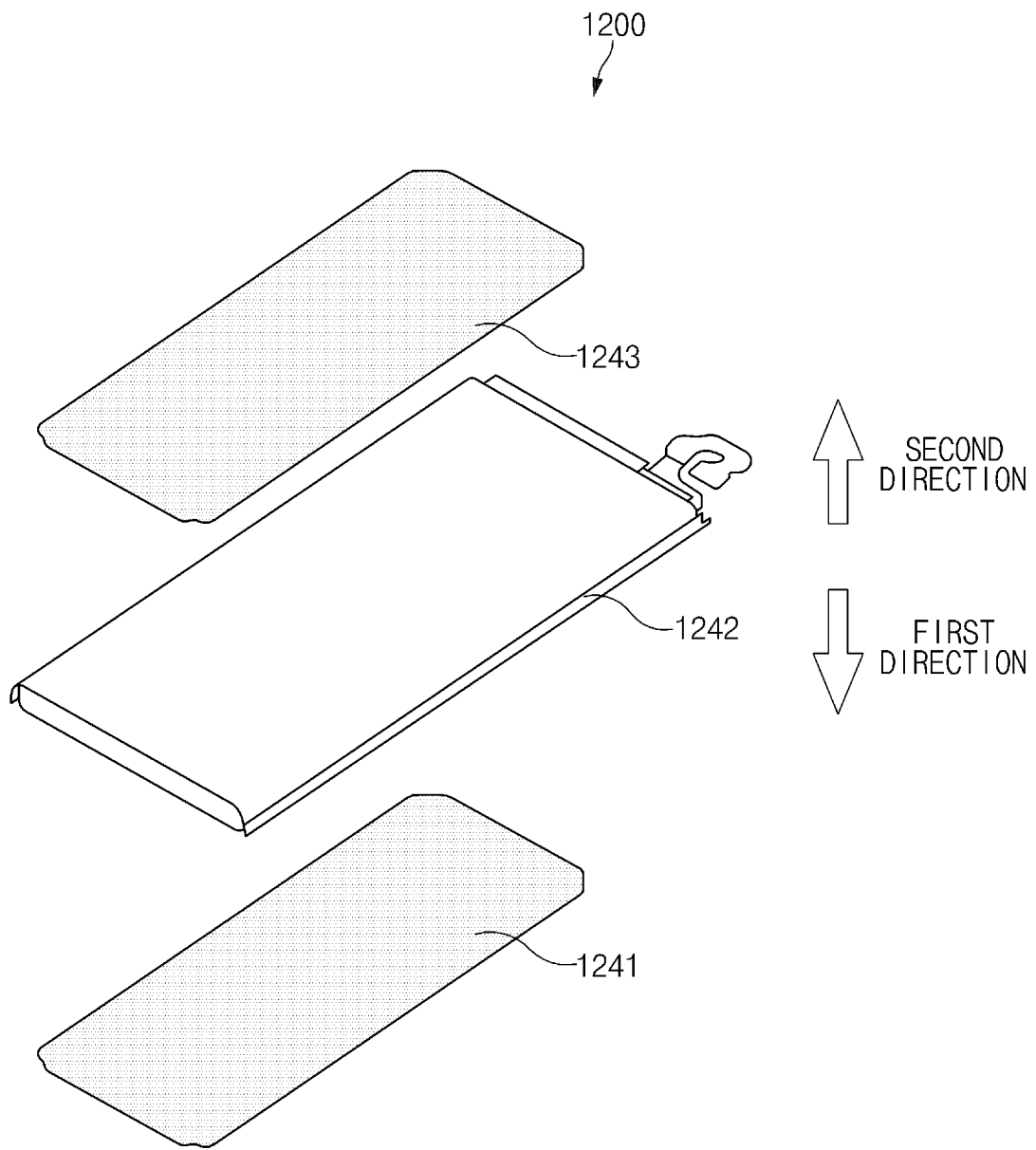
FIG. 12 shows another example of a battery structure having the same type of adhesive layers according to an embodiment of the disclosure.

FIG. 12 shows another example of a battery structure having the same type of adhesive layers according to an embodiment of the disclosure.

With reference to FIG. 12, a battery structure 1200 according to an embodiment may include a first adhesive layer 1241, a battery 1242, and a second adhesive layer 1243.

The battery 1242 includes a pouch enclosing a jelly-roll. In addition, a roll fixing tape for preventing a jelly-roll loosening may be disposed on one region of the jelly-roll.

The first adhesive layer 1241 may have a filled-center portion, a predetermined size, and a face. At least a portion of the first adhesive layer 1241 may be attached to a face of the battery 1242 facing a first direction side. The second adhesive layer 1243 may have the same shape and size as the first adhesive layer 1241.

A position of the second adhesive layer 1243 on the battery 1242 may be the same as or different from that of the first adhesive layer 1241. At least a portion of the second adhesive layer 1243 may be attached to a face of the battery 1242 facing a second direction side. As previously described in other figures (e.g., FIG. 6 and FIG. 7), top and bottom ends of the first adhesive layer 1241 and top and bottom ends of the second adhesive layer 1243 may be aligned with top and bottom ends of the roll fixing tape disposed within the battery 1242.

It should be understood that various embodiments of the disclosure and terms used in the embodiments do not intend to limit technologies disclosed in the disclosure to the particular forms disclosed herein; rather, the disclosure should be construed to cover various modifications, equivalents, and/or alternatives of embodiments of the disclosure. With regard to description of drawings, similar components may be assigned with similar reference numerals. As used herein, singular forms may include plural forms as well unless the context clearly indicates otherwise. In the disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

In the present specification, depending on situations, a phrase "adapted to or configured to" may be interchangeable with phrases, for example, "suitable for", "having an ability to", "modified to", "made to", "capable of", or "designed to" in terms of hardware or software. In some situations, an expression "a device configured to -" may mean that the device may be "capable of -" with other devices or components. For example, a phrase "a processor adapted (or configured) to -" may mean a dedicated processor (e.g., an embedded processor) for performing corresponding operations, or a general-purpose processor (e.g. a CPU or an AP) capable of performing the corresponding operations by executing one or more programs stored in a memory device (e.g. a memory 130).

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. The "module" may be implemented either mechanically or electronically. In addition, the module may include, for example, known or later to-be-developed, application-specific integrated circuit (ASIC) chips, field-programmable gate arrays (FPGAs), or programmable logic devices that perform certain operations.

At least a portion of devices (e.g., modules or functions thereof) or methods (e.g., operations) according to various embodiments may be implemented as an instruction stored in a computer readable storage medium (e.g., memory 130) in a form of a program module. When the instruction is executed by the processor (e.g., the processor 120), the processor may perform a function corresponding to the instruction. A computer readable recording medium may include a hard disk, a floppy disk, a magnetic medium (e.g. a magnetic tape), an optical recording media (e.g., a CD-ROM, a DVD, a magneto-optical medium (e.g., a floptical disk)), a built-in memory, and the like. The instruction may include a code generated or executed by a compiler or an interpreter.

Each component (e.g., the module or the program module) according to various embodiments may include at least one object, and a portion of the above sub-components may be omitted, or additional other sub-components may be further included. Alternatively or additionally, some components (e.g., the module or the program module) may be integrated in one component and may perform the same or similar functions performed by each corresponding components prior to the integration. Operations performed by a module, a program module, or other components according to various embodiments of the disclosure may be executed sequentially, in parallel, repeatedly, or in a heuristic method. Also, at least some operations may be executed in different sequences, omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a display;
   a first plate having a first side and a second side opposing the first side, wherein the display is disposed on the first side;
   a second plate coupled to the second side of the first plate,
   a jelly-roll;
   a roll fixing tape disposed on one region of the jelly-roll having a first edge,
   a pouch containing the jelly-roll and the roll fixing tape, wherein the pouch has a first face and a second face, and wherein the first face covers the roll fixing tape such that the first edge of the roll fixing tape is separated by a first distance from a first edge of the first face; and
   a first adhesive layer is disposed between the first plate and the second plate, the first adhesive layer having a first edge
   wherein the first adhesive layer is attached the first face of the pouch and adheres to the second side of the first plate, and
   wherein the first edge of the first adhesive layer is separated from the first edge of the first face by a distance substantially the same as the first distance.

2. The electronic device of claim 1, wherein the roll fixing tape has a second edge, the first adhesive layer has a second edge, and the first face has a second edge, and wherein the second edge of the roll fixing tape is separated by a second distance from the second edge of the first face, and wherein the second edge of the first adhesive layer is separated from the second edge of the first plate by a distance substantially the same as the second distance.

3. The electronic device of claim 1, wherein one axial length of the roll fixing tape and one axial length of the first adhesive layer are the same.

4. The electronic device of claim 1, wherein the first adhesive layer includes a film having a predetermined size and face.

5. The electronic device of claim 1, wherein the first adhesive layer comprises a hollow band.

6. The electronic device of claim 2, wherein the first adhesive layer includes:
   a first side portion spaced by a predetermined distance inwardly from one side end of the pouch;
   a second side portion opposite to the first side portion about a center of the pouch, wherein the second side portion is spaced apart from the first side portion by the predetermined distance;
   a third side portion connecting one side edge of the first side portion and one side edge of the second side portion; and a fourth side portion connecting another side edge of the first side portion and an other side edge of the second side portion.

7. The electronic device of claim 6, wherein the first side portion and the second side portion have the same thickness.

8. The electronic device of claim 6, wherein the third side portion and the fourth side portion have the same thickness.

9. The electronic device of claim 6, wherein a top end of the first side portion is common with the first edge of the roll fixing tape.

10. The electronic device of claim 6, wherein a bottom end of the second side portion is common with the second edge of the roll fixing tape.

11. The electronic device of claim 6, wherein an inner face of the third side portion and a first side edge of the roll fixing tape are common with each other.

12. The electronic device of claim 6, wherein an inner face of the fourth side portion and a second side edge of the roll fixing tape are common with each other.

13. The electronic device of claim 1, further comprising a second adhesive layer disposed between the second plate and the pouch.

14. The electronic device of claim 13, wherein one end of the second adhesive layer and the first edge of the roll fixing tape face in the same direction.

15. The electronic device of claim 13, wherein the other end of the second adhesive layer and a second edge of the roll fixing tape face in the same direction.

16. The electronic device of claim 13, wherein one axial length of the second adhesive layer and one axial length of the roll fixing tape are the same.

* * * * *